United States Patent
Ono et al.

(10) Patent No.: US 12,098,305 B2
(45) Date of Patent: Sep. 24, 2024

(54) LAMINATE PRODUCTION METHOD

(71) Applicant: KURARAY CO., LTD., Kurashiki (JP)

(72) Inventors: Tomohiro Ono, Tsukuba (JP); Makoto Akai, Tsukuba (JP); Moe Kawahara, Tsukuba (JP); Kanayo Nakada, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 745 days.

(21) Appl. No.: 17/273,569

(22) PCT Filed: Aug. 30, 2019

(86) PCT No.: PCT/JP2019/034266
§ 371 (c)(1),
(2) Date: Mar. 4, 2021

(87) PCT Pub. No.: WO2020/050184
PCT Pub. Date: Mar. 12, 2020

(65) Prior Publication Data
US 2022/0106503 A1    Apr. 7, 2022

(30) Foreign Application Priority Data
Sep. 5, 2018 (JP) .................... 2018-165815

(51) Int. Cl.
| B32B 27/30 | (2006.01) |
|---|---|
| C09J 133/08 | (2006.01) |
| C09J 133/10 | (2006.01) |
| C09J 133/12 | (2006.01) |
| C09J 153/00 | (2006.01) |

(52) U.S. Cl.
CPC ....... *C09J 153/005* (2013.01); *C09J 2433/00* (2013.01)

(58) Field of Classification Search
None
See application file for complete search history.

(56) References Cited

U.S. PATENT DOCUMENTS

| 5,041,251 A | 8/1991 | McCoskey et al. |
|---|---|---|
| 5,264,527 A | 11/1993 | Varshney et al. |
| 5,294,674 A | 3/1994 | Varshney et al. |
| 5,591,816 A | 1/1997 | Varshney et al. |
| 5,668,231 A | 9/1997 | Varshney et al. |
| 6,120,899 A * | 9/2000 | Cameron ............ C08J 3/124 428/407 |
| 2016/0122603 A1* | 5/2016 | Nakada ............ C08F 297/026 525/299 |
| 2021/0115197 A1* | 4/2021 | Akai ............ C08J 3/124 |

FOREIGN PATENT DOCUMENTS

| EP | 0 410 914 A1 | 1/1991 | |
|---|---|---|---|
| EP | 2 921 278 A1 | 9/2015 | |
| JP | 5-508116 A | 11/1993 | |
| JP | 6-93060 A | 4/1994 | |
| JP | 7-25859 B2 | 3/1995 | |
| JP | 11-335432 A | 12/1999 | |
| JP | 2003-253005 A | 9/2003 | |
| JP | 2009-167312 A | 7/2009 | |
| JP | 2012207155 A * | 10/2012 | ............ C08J 3/12 |
| JP | 2015-178248 A | 10/2015 | |
| JP | 2016-104830 A | 6/2016 | |
| JP | 2016-188327 A | 11/2016 | |

OTHER PUBLICATIONS

Machine translation of JP-2012207155-A (no date).*
International Search Report and Written Opinion issued Nov. 26, 2019 in PCT/JP2019/034266 (with English Translation), 29 pages.
Georges Moineau et al., "Synthesis of fully acrylic thermoplastic elastomers by atom transfer radical polymerization (ATRP), 2ᵃ; Effect of the catalyst on the molecular control and the rheological properties of the triblock copolymers", Macromol.Chem.Phys., 201, 2000, pp. 1108-1114.
Extended European Search Report issued Jul. 12, 2022 in European Patent Application No. 19 85 8259.5, 12 pages.

* cited by examiner

*Primary Examiner* — Michael J Feely
(74) *Attorney, Agent, or Firm* — Oblon, McClelland, Maier & Neustadt, L.L.P.

(57) ABSTRACT

A laminate production method is provided which can sufficiently prevent the occurrence of blocking without causing deterioration in the outstanding characteristics of acrylic block copolymers such as adhesive performance, and can also ensure excellent processability during extrusion. The laminate production method includes a step (1) of bringing raw pellets of an acrylic block copolymer (A) into contact with an aqueous dispersion (C) containing acrylic resin particles (B) and no surfactants, the acrylic block copolymer (A) including at least one polymer block (a1) including acrylic acid alkyl ester units and at least one polymer block (a2) including methacrylic acid alkyl ester units, a step (2) of removing water attached to the pellets and thereby obtaining pellets (D), and a step (3) of preparing an adhesive composition using an adhesive feedstock including the pellets (D) from the step (2), and extruding the adhesive composition to form an adhesive layer and thereby producing a laminate including the adhesive layer and a substrate layer.

10 Claims, No Drawings

LAMINATE PRODUCTION METHOD

TECHNICAL FIELD

The present invention relates to a method for producing a laminate that has a substrate layer and an adhesive layer which includes an adhesive composition obtained from antiblock-treated acrylic block copolymer pellets.

BACKGROUND ART

Acrylic block copolymers that include a polymer block composed of acrylic acid ester units and a polymer block composed of methacrylic acid ester units have characteristics which make them attractive for use in various applications such as adhesives, soft materials and resin modifiers. These acrylic block copolymers are used in various shaping methods such as injection molding and extrusion, and are therefore usually produced in the form of granular pellets. Unfortunately, the acrylic block copolymers usually contain soft components and easily become blocked.

A possible approach to preventing this blocking is to apply an antiblocking agent such as ethylenebisstearamide to the surface of the pellets. However, the use of ethylenebisstearamide as an antiblocking agent results in problems such as a decrease in the transparency of shaped articles that are obtained, and the occurrence of die buildup.

An approach proposed to solve this problem is to add a lubricant to an acrylic block copolymer (for example, Patent Literature 1).

CITATION LIST

Patent Literature

Patent Literature 1: JP-A-2003-253005

SUMMARY OF INVENTION

Technical Problem

It has been found that the antiblocking approach described in the above patent literature is sometimes incapable of sufficiently preventing the occurrence of blocking, and adhesive tapes that are made using pellets obtained according to such an approach tend to suffer deterioration in the outstanding characteristics of acrylic block copolymers such as adhesive performance. An object of the present invention is to provide a laminate production method that can sufficiently prevent the occurrence of blocking without causing deterioration in the outstanding characteristics of acrylic block copolymers such as adhesive performance, and can also ensure excellent processability during extrusion of a material including an acrylic block copolymer such as an adhesive composition.

Solution to Problem

The present inventors carried out extensive studies directed to achieving the above object, and have consequently found that pellets of an acrylic block copolymer obtained through a step of contact with a specific aqueous dispersion containing acrylic resin particles are useful as an adhesive feedstock, and an adhesive composition including this adhesive feedstock can be extruded with excellent processability to form an adhesive layer on a substrate layer and the resultant laminate maintains the outstanding characteristics of the acrylic block copolymer such as adhesive performance.

According to the present invention, the object described above is achieved by providing:

[1] A laminate production method including a step (1) of bringing raw pellets of an acrylic block copolymer (A) into contact with an aqueous dispersion (C) containing acrylic resin particles (B) and no surfactants, the acrylic block copolymer (A) including at least one polymer block (a1) including acrylic acid alkyl ester units and at least one polymer block (a2) including methacrylic acid alkyl ester units, a step (2) of removing water attached to the pellets and thereby obtaining pellets (D), and a step (3) of preparing an adhesive composition using an adhesive feedstock including the pellets (D) from the step (2), and extruding the adhesive composition to form an adhesive layer and thereby producing a laminate including the adhesive layer and a substrate layer;

[2] The laminate production method described in [1], wherein the adhesive layer and the substrate layer are both formed by extrusion in the step (3);

[3] A laminate production method including a step (1) of bringing raw pellets of an acrylic block copolymer (A) into contact with an aqueous dispersion (C) containing acrylic resin particles (B) and no surfactants, the acrylic block copolymer (A) including at least one polymer block (a1) including acrylic acid alkyl ester units and at least one polymer block (a2) including methacrylic acid alkyl ester units, a step (2) of removing water attached to the pellets and thereby obtaining pellets (D), a step (2') of bringing additional acrylic resin particles (B) into contact with the pellets (D) and thereby obtaining pellets (D'), and a step (3') of preparing an adhesive composition using an adhesive feedstock including the pellets (D') from the step (2'), and extruding the adhesive composition to form an adhesive layer and thereby producing a laminate including the adhesive layer and a substrate layer;

[4] The laminate production method described in [3], wherein the adhesive layer and the substrate layer are both formed by extrusion in the step (3');

[5] The laminate production method described in [3] or [4], wherein the adhesive composition is prepared in the step (3') by melt kneading of an adhesive feedstock including the pellets (D) and the pellets (D');

[6] A laminate production method including a step of preparing an adhesive composition using an adhesive feedstock including pellets (D), and extruding the adhesive composition to form an adhesive layer and thereby producing a laminate including the adhesive layer and a substrate layer, wherein
the pellets (D) are pellets obtained through a step of bringing raw pellets of an acrylic block copolymer (A) into contact with an aqueous dispersion (C) containing acrylic resin particles (B) and no surfactants, the acrylic block copolymer (A) including at least one polymer block (a1) including acrylic acid alkyl ester units and at least one polymer block (a2) including methacrylic acid alkyl ester units, and the pellets (D) are such that the acrylic resin particles (B) are attached to the acrylic block copolymer (A);

[7] The laminate production method described in any of [1] to [6], wherein the aqueous dispersion (C) includes at least one selected from the group consisting of an aqueous dispersion (C-1) containing wet-ground acrylic resin particles (B), and an aqueous dispersion (C-2) containing dry-ground acrylic resin particles (B); and

[8] The laminate production method described in [7], wherein the aqueous dispersion (C) includes an aqueous dispersion (C-1) containing wet-ground acrylic resin particles (B).

Advantageous Effects of Invention

According to the present invention, a laminate may be obtained by extruding a material including an acrylic block copolymer such as an adhesive composition while ensuring that the material exhibits excellent processability during the extrusion and also ensuring that the occurrence of blocking is sufficiently prevented and the outstanding characteristics of the acrylic block copolymer such as adhesive performance are not impaired.

DESCRIPTION OF EMBODIMENTS

The present invention will be described in detail hereinbelow. In the present specification, "(meth)acrylic acid ester" is a general term for "methacrylic acid ester" and "acrylic acid ester", and "(meth)acrylic" is a general term for "methacrylic" and "acrylic".

(Acrylic Block Copolymers (A))

An acrylic block copolymer (A) that is included in raw pellets used in the present invention has at least one polymer block (a1) including acrylic acid alkyl ester units, and at least one polymer block (a2) including methacrylic acid alkyl ester units.

Examples of the acrylic acid alkyl esters which form structural units of the polymer blocks (a1) include methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate.

When the alkyl group in the acrylic acid alkyl ester is a short-chain alkyl group having 4 or less carbon atoms in the main chain thereof (such as, for example, methyl acrylate, ethyl acrylate, propyl acrylate, n-butyl acrylate or t-butyl acrylate), the acrylic block copolymer (A) tends to show enhanced fluidity and tensile strength. When the alkyl group contained in the acrylic acid alkyl ester is a long-chain alkyl group having 6 or more carbon atoms in the main chain thereof (such as, for example, n-hexyl acrylate, cyclohexyl acrylate, 2-ethylhexyl acrylate, n-octyl acrylate, lauryl acrylate, tridecyl acrylate or stearyl acrylate), the acrylic block copolymer (A) tends to show enhanced low-temperature characteristics.

The acrylic acid alkyl ester units which are structural units of the polymer block (a1) may be composed of a single acrylic acid alkyl ester or may be composed of two or more kinds of acrylic acid alkyl esters. The proportion of the acrylic acid alkyl ester units contained in the polymer block (a1) is preferably not less than 60 mass %, more preferably not less than 80 mass %, and still more preferably not less than 90 mass % of the polymer block (a1). The acrylic acid alkyl ester units may represent 100 mass % of the polymer block (a1).

The polymer block (a1) may include other monomer units without impairing the advantageous effects of the present invention. Examples of the monomers for forming such additional units include methacrylic acid alkyl esters described later, methacrylic acid esters having no functional groups except methacrylic acid alkyl esters, methacrylic acid esters having a functional group, acrylic acid esters having no functional groups except acrylic acid alkyl esters, acrylic acid esters having a functional group, vinyl monomers having a carboxyl group, vinyl monomers having a functional group, aromatic vinyl monomers, conjugated diene monomers, olefin monomers, and lactone monomers. When these monomers are used, the amount thereof is usually small and is preferably not more than 40 mass %, more preferably not more than 20 mass %, and still more preferably not more than 10 mass % of the total mass of the monomers used for the formation of the polymer block (a1).

The glass transition temperature of the polymer block (a1) is preferably −100 to 40° C., more preferably −80 to 35° C., and still more preferably −70 to 30° C. When the glass transition temperature of the polymer block (a1) is in the above range, excellent flexibility and adhesive characteristics are obtained even at low temperatures. To ensure that the glass transition temperature of the polymer block (a1) will fall in the above preferred range and to take advantage of high availability, methyl acrylate, propyl acrylate, n-butyl acrylate, 2-ethylhexyl acrylate and n-octyl acrylate are preferable among the acrylic acid alkyl esters described hereinabove.

The acrylic block copolymer (A) may include two or more polymer blocks (a1). In such a case, the polymer blocks (a1) may be the same as or different from one another.

Examples of the methacrylic acid alkyl esters which form structural units of the polymer blocks (a2) include methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate. Of these, methyl methacrylate, ethyl methacrylate and propyl methacrylate are preferable. Methyl methacrylate is more preferable for reasons such as because it is economically easily available and because the polymer block (a2) that is obtained has excellent durability and weather resistance.

The methacrylic acid alkyl ester units which are structural units of the polymer block (a2) may be composed of a single methacrylic acid alkyl ester or may be composed of two or more kinds of methacrylic acid alkyl esters. The proportion of the methacrylic acid alkyl ester units contained in the polymer block (a2) is preferably not less than 60 mass %, more preferably not less than 80 mass %, and still more preferably not less than 90 mass % of the polymer block (a2). The methacrylic acid alkyl ester units may represent 100 mass % of the polymer block (a2).

The polymer block (a2) may include other monomer units without impairing the advantageous effects of the present invention. Examples of such additional monomers include methacrylic acid esters having no functional groups except methacrylic acid alkyl esters, such as phenyl methacrylate and benzyl methacrylate; methacrylic acid esters having a functional group, such as methacrylic acid alkoxyalkyl esters including methoxyethyl methacrylate and ethoxyethyl methacrylate, diethylaminoethyl methacrylate, 2-hydroxyethyl methacrylate, 2-aminoethyl methacrylate, glycidyl methacrylate and tetrahydrofurfuryl methacrylate; the acrylic acid alkyl esters described hereinabove; acrylic acid esters having no functional groups except acrylic acid alkyl esters, such as phenyl acrylate and benzyl acrylate; acrylic acid esters having a functional group such as acrylic acid alkoxyalkyl esters including methoxyethyl acrylate and ethoxyethyl acrylate, diethylaminoethyl acrylate, 2-hydroxyethyl acrylate, 2-aminoethyl acrylate, glycidyl acrylate and tetrahydrofurfuryl acrylate; vinyl monomers having a carboxyl group such as (meth)acrylic acid, crotonic acid, maleic acid, maleic anhydride, fumaric acid and (meth)acrylamide; vinyl monomers having a functional group such as (meth)acrylonitrile, vinyl acetate, vinyl chloride and vinylidene chloride; aromatic vinyl monomers such as styrene, α-methylstyrene, p-methylstyrene and m-methylstyrene; conjugated diene monomers such as butadiene and isoprene; olefin monomers such as ethylene, propylene, isobutene and octene; and lactone monomers such as ε-caprolactone and valerolactone. When these monomers are used, the amount thereof is usually small and is preferably not more than 40 mass %, more preferably not more than 20 mass %, and still more preferably not more than 10 mass % of the total mass of the monomers used for the formation of the polymer block (a2).

The glass transition temperature of the polymer block (a2) is preferably 50 to 150° C., more preferably 70 to 140° C., and still more preferably 80 to 130° C. When the glass transition temperature of the polymer block (a2) is in the above range, the polymer shows a reduced tendency to become blocked when stored as pellets at high temperatures (for example, 50° C.) and the adhesive composition tends to attain high holding power.

The acrylic block copolymer (A) may include two or more polymer blocks (a2). In such a case, the polymer blocks (a2) may be the same as or different from one another.

The weight average molecular weight of the polymer block (a2) is not particularly limited, but is preferably in the range of 1,000 to 50,000, and more preferably in the range of 4,000 to 20,000. If the weight average molecular weight of the polymer block (a2) is less than 1,000, the acrylic block copolymer (A) that is obtained may have an insufficient cohesive force. If the weight average molecular weight of the polymer block (a2) is higher than 50,000, the melt viscosity of the obtainable acrylic block copolymer (A) is so increased that the productivity of the acrylic block copolymer (A), and properties such as shaping properties of pellets including the acrylic block copolymer (A) may be deteriorated. In the present specification, the weight average molecular weight (Mw) means the weight average molecular weight measured by a gel permeation chromatography (GPC) method relative to standard polystyrenes.

In the acrylic block copolymer (A), the difference in glass transition temperature between the polymer block (a2) and the polymer block (a1) is preferably not less than 70° C., and more preferably not less than 100° C.

The acrylic block copolymer (A) is preferably represented by any of the general formulae below where "a2" is the polymer block (a2) and "a1" is the polymer block (a1):

$(a2-a1)n$ $(a2-a1)n-a2$ $a1-(a2-a1)n$ $(a2-a1)n-Z$ $(a1-a2)n-Z$

In the formulae, n is an integer of 1 to 30, and Z is a coupling site (a coupling site resulting from the formation of a chemical bond by the reaction of the polymer end with a coupling agent). The value of n is preferably 1 to 15, more preferably 1 to 8, and still more preferably 1 to 4.

Of the structures described above, those in which the polymer block (a2) is bonded to each of both ends of the polymer block (a1) are preferable.

Specifically, those represented by the following general formulae are preferable:

$(a2-a1)_m$ $(a2-a1)_n-a2$ $a1-(a2-a1)_m$ $(a2-a1)_m-Z$ $(a1-a2)_m-Z$

In the formulae, n is an integer of 1 to 30, m is an integer of 2 to 30, and Z is a coupling site (a coupling site resulting from the formation of a chemical bond by the reaction of the polymer end with a coupling agent). The value of m is preferably 2 to 15, more preferably 2 to 8, and still more preferably 2 to 4.

Of the above structures, linear block copolymers represented by $(a2-a1)_n$, $(a2-a1)_n-a2$, and $a1-(a2-a1)_n$ are more preferable, and the diblock copolymer represented by a2-a1, and the triblock copolymer represented by a2-a1-a2 are still more preferable. These may be used singly, or two or more may be used in combination.

The content of the polymer block (a2) in the acrylic block copolymer (A) is preferably 5 to 40 mass %.

If the content of the polymer block (a2) is less than 5 mass %, the acrylic block copolymer (A) may be too much fluid and may be liquid or be incapable of keeping the pellet shape when the acrylic block copolymer (A) is pelletized by, for example, cutting with an underwater cutter or the like, and further the adhesive composition tends to show lower holding power than expected. If the content of the polymer block (a2) exceeds 40 mass %, the adhesive composition tends to fail to attain expected tack characteristics.

To obtain pellets with excellent flexibility, the content of the polymer block (a2) in the acrylic block copolymer (A) is preferably 8 to 35 mass %, and more preferably 15 to 31 mass %.

From the points of view of the compatibility with acrylic resin particles (B) contained in an aqueous dispersion (C) described later and the processability of pellets including the acrylic block copolymer (A) that is obtained, the weight average molecular weight of the acrylic block copolymer (A) is preferably 30,000 to 250,000, more preferably 40,000 to 200,000, still more preferably 50,000 to 180,000, and further preferably 60,000 to 160,000. If the weight average molecular weight of the acrylic block copolymer (A) is less than 30,000, the cohesive force of the acrylic block copolymer (A) may be insufficient, and the adhesive composition that is obtained may be inferior in holding power and durability. Other problems may arise such as the acrylic block copolymer (A) bleeding on the surface of the adhesive composition. If, on the other hand, the weight average molecular weight of the acrylic block copolymer (A) exceeds 250,000, the melt viscosity is so increased that the productivity and processability may be deteriorated. Other problems may arise such as low compatibility with acrylic resin particles (B) described later, insufficient transparency of the adhesive composition that is obtained, and variations in properties of the adhesive composition that is obtained.

In the acrylic block copolymer (A), the molecular weight distribution (Mw/Mn) is preferably 1.0 to 1.5. When the molecular weight distribution of the acrylic block copolymer (A) is in the above range, the adhesive composition will attain an increased cohesive force while not tending to contaminate the adherend. From these points of view, the molecular weight distribution is more preferably 1.0 to 1.4, and still more preferably 1.0 to 1.3. In the present specification, the number average molecular weight (Mn) and the weight average molecular weight (Mw) mean the number average molecular weight and the weight average molecular weight measured by a gel permeation chromatography (GPC) method relative to standard polystyrenes.

The acrylic block copolymer (A) may be produced by any production method in accordance with a known process without limitation. In general, a block copolymer having a narrow molecular weight distribution is obtained by the living polymerization of monomers as structural units. Examples of such living polymerization processes include living polymerization using an organic rare earth metal complex as a polymerization initiator (see, for example, JP-A-H11-335432), living anionic polymerization using an organoalkali metal compound as a polymerization initiator in the presence of a mineral acid salt such as an alkali metal or alkaline earth metal salt (see, for example, JP—B-H07-25859), living anionic polymerization using an organoalkali metal compound as a polymerization initiator in the presence of an organoaluminum compound (see, for example, JP-A-H06-93060), and atom transfer radical polymerization (ATRP) (see, for example, Macromol. Chem. Phys., 2000, 201, pp. 1108-1114).

Of the above production processes, living anionic polymerization in the presence of an organoaluminum compound is advantageous in that the decrease in activity during the polymerization is small and thus the block copolymer obtained contains little homopolymers and has high transparency. Further, the block copolymer contains little residual monomers by virtue of the high rate of monomer to polymer conversion, and the acrylic block copolymer (A) can be pelletized with suppressed generation of froths. Furthermore, the polymer block including methacrylic acid alkyl ester units has a highly syndiotactic molecular structure to effectively enhance the durability of pellets including the acrylic block copolymer (A) that are obtained. Further, the living anionic polymerization is feasible under relatively mild temperature conditions and thus the environmental load in industrial production (mainly the electricity for refrigerators to control the polymerization temperature) is advantageously small. For these reasons, the acrylic block copolymer (A) is preferably produced by living anionic polymerization using an organoalkali metal compound as a polymerization initiator in the presence of an organoaluminum compound.

In an example method of living anionic polymerization in the presence of an organoaluminum compound, (meth)acrylic acid esters may be polymerized in the presence of an organolithium compound and an organoaluminum compound represented by the following general formula (1):

$$AlR^1R^2R^3 \quad (1)$$

wherein $R^1$, $R^2$ and $R^3$ are each independently an optionally substituted alkyl group, an optionally substituted cycloalkyl group, an optionally substituted aryl group, an optionally substituted aralkyl group, an optionally substituted alkoxyl group, an optionally substituted aryloxy group or an N,N-disubstituted amino group, or wherein $R^1$ represents any of the above groups and $R^2$ and $R^3$ together form an optionally substituted arylenedioxy group. Where necessary, the polymerization further involves an ether compound such as dimethyl ether, dimethoxyethane, diethoxyethane or 12-crown-4; and/or a nitrogen-containing compound such as triethylamine, N,N,N',N'-tetramethylethylenediamine, N,N,N',N'',N''-pentamethyldiethylenetriamine, 1,1,4,7,10,10-hexamethyltriethylenetetramine, pyridine or 2,2'-dipyridyl, in the reaction system.

Examples of the organolithium compounds include alkyllithiums and alkyldilithiums such as n-butyllithium, sec-butyllithium and tetramethylenedilithium; aryllithiums and aryldilithiums such as phenyllithium and xylyllithium; aralkyllithiums and aralkyldilithiums such as benzyllithium and dilithium formed by the reaction of diisopropenylbenzene and butyllithium; lithium amides such as lithium diisopropylamide; and lithium alkoxides such as methoxylithium.

From points of view such as high living properties during polymerization and easy handling, some preferred organoaluminum compounds represented by the general formula (1) are isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)] aluminum.

The acrylic block copolymer (A) is used as raw pellets. The raw pellets including the acrylic block copolymer (A) may be produced by, for example, melt extruding the acrylic block copolymer (A) into strands and cutting the strands with an underwater cutter, a center hot cutter, a strand cutter or the like into pellets. The form of the raw pellets is not particularly limited as long as the pellets can be brought into contact with an aqueous dispersion (C) described later which contains acrylic resin particles (B) and no surfactants. The raw pellets usually have a substantially cylindrical or substantially spherical (elliptical) form. The maximum diameter of the raw pellets of the acrylic block copolymer (A) is preferably 2 to 8 mm, and more preferably 2 to 6 mm. The maximum diameter of the raw pellets may be determined depending on the shape by measuring the maximum column height in the case of substantially cylindrical shape or the longest side across an ellipsoid in the case of substantially spherical shape, with use of a commercially available length-measuring gauge.

The content of the acrylic block copolymer (A) included in the raw pellets is preferably not less than 80 mass %, more preferably not less than 90 mass %, and particularly preferably 100 mass % of the raw pellets.

In the production of the raw pellets, additives such as, for example, tackifier resins, plasticizers and softeners described later may be added as required to the acrylic block copolymer (A) as long as the characteristics of the acrylic block copolymer (A) are not impaired, and the mixture may be formed into raw pellets.

(Aqueous Dispersions (C))

An aqueous dispersion (C) used in the present invention contains acrylic resin particles (B) and no surfactants.

The acrylic resin forming the acrylic resin particles (B) is a polymer principally including (meth)acrylic acid ester units, and preferably contains methyl methacrylate units at not less than 85 mass %, more preferably not less than 88 mass %, and still more preferably not less than 90 mass %. The content of methyl methacrylate units may be 100 mass %.

When the acrylic resin particles (B) contained in the aqueous dispersion (C) have a content of methyl methacrylate units in the above range, the compatibility thereof with the raw pellets of the acrylic block copolymer (A) is enhanced, with the result that excellent transparency tends to be obtained.

The acrylic resin may include monomer units other than the methyl methacrylate units.

Examples of the monomers which may form such additional monomer units include methacrylic acid alkyl esters (except methyl methacrylate) such as ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate; acrylic acid alkyl esters such as methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate; (meth)acrylic acid esters except (meth)acrylic acid alkyl esters, such as methoxyethyl (meth)acrylate, ethoxyethyl (meth)acrylate, diethylaminoethyl (meth)acrylate, glycidyl (meth)acrylate and tetrahydrofurfuryl (meth)acrylate; aromatic vinyl compounds such as styrene, α-methylstyrene and p-methylstyrene; conjugated diene compounds such as butadiene and isoprene; olefin compounds such as ethylene and propylene; acrylic acid; and methacrylic acid.

Of these additional monomers, methacrylic acid alkyl esters (except methyl methacrylate), acrylic acid alkyl esters and methacrylic acid are preferable.

The content of the additional monomer units is preferably not more than 15 mass %, more preferably not more than 12 mass %, and still more preferably not more than 10 mass %. The content of the additional monomer units may be 0 mass %.

When the acrylic resin is a methyl methacrylate copolymer, the form of the copolymer is not particularly limited and may be, for example, random copolymer, block copolymer, graft copolymer, alternate copolymer or the like. In particular, a methyl methacrylate random copolymer is preferable, and a methyl methacrylate-methyl acrylate random copolymer is more preferable from the points of view of higher antiblocking properties and availability.

The stereoregularity of the acrylic resin is not particularly limited and may be isotactic, heterotactic or syndiotactic.

The weight average molecular weight of the acrylic resin is preferably 50,000 to 100,000. When the weight average molecular weight is in the above range, the resin exhibits good compatibility with the acrylic block copolymer (A), and the adhesive composition that is obtained will attain high transparency and high adhesive performance. From the point of view of the balance between the compatibility with the acrylic block copolymer (A) and antiblocking properties, the weight average molecular weight is more preferably 60,000 to 95,000, and still more preferably 70,000 to 90,000.

The acrylic resin may be produced by any method without limitation, for example, by solution polymerization, emulsion polymerization, bulk polymerization or the like. Further, the acrylic resin may be a mixture of two or more kinds of polymers having different compositions or a mixture of polymers obtained by different production methods. The initiator used at the polymerization is preferably a radical polymerization initiator. Examples of the radical polymerization initiators include azo compounds such as azobisisobutyronitrile (AIBN) and azobis-γ-dimethylvaleronitrile; and peroxides such as benzoyl peroxide, cumyl peroxide, peroxyneodecanoate, diisopropyl peroxydicarbonate, t-butyl cumyl peroxide, cumenehydroperoxide, t-butyl hydroperoxide, cyclohexanone peroxide, methyl ethyl ketone peroxide, dicumyl peroxide and lauroyl peroxide. The radical polymerization initiator is usually used in an amount of 0.05 to 0.5 parts by mass with respect to 100 parts by mass of all the monomers used in the production of the acrylic resin. The polymerization is usually performed at a temperature of 50 to 140° C. for 2 to 20 hours. A chain transfer agent may be used to control the molecular weight of the acrylic resin. Examples of the chain transfer agents include methyl mercaptan, ethyl mercaptan, isopropyl mercaptan, n-butyl mercaptan, t-butyl mercaptan, n-hexyl mercaptan, n-octyl mercaptan, n-dodecyl mercaptan, ethyl thioglycolate, mercaptoethanol, thio-β-naphthol and thiophenol. The chain transfer agent is usually used in the range of 0.005 to 0.5 mass % relative to all the monomers used in the production of the acrylic resin.

The acrylic resin particles (B) are preferably produced by preparing an acrylic resin as described hereinabove and grinding the resin. The grinding may be dry grinding or wet grinding.

In a preferred embodiment, the aqueous dispersion (C) includes at least one selected from the group consisting of an aqueous dispersion (C-1) containing wet-ground acrylic resin particles (B), and an aqueous dispersion (C-2) containing dry-ground acrylic resin particles (B).

Dry grinding is a technique suited for pulverizing a produced mass of resin into moderately large resin particles (for example, 1 to 100 μm). Wet grinding is a technique suited for producing smaller resin particles (for example, 1 μm to 50 μm). Dry grinding and wet grinding may be performed in combination. Further, the resin particles may be classified using a sieve or the like so as to attain the desired particle size or the desired grain size distribution.

The D50 value in the particle size distribution of the acrylic resin particles (B) is preferably 1 to 50 μm, more preferably 1 to 25 μm, and still more preferably 1 to 15 μm. This range of the D50 value ensures that the stability of the aqueous dispersion (C) will be enhanced, and further ensures that the acrylic resin particles (B) will attach favorably to the raw pellets of the acrylic block copolymer (A), and consequently pellets (D) described later will attain excellent antiblocking properties. Further, the adhesive composition obtained by melt kneading the pellets (D) will attain high transparency and good adhesive performance. If the value is smaller than 1 μm, the particles will attach excellently but will be difficult to produce by wet grinding and dry grinding with high productivity. If the value is larger than 50 μm, the particles tend to be precipitated significantly and are sometimes difficult to produce in the form of the aqueous dispersion (C). The D50 value in the particle size distribution of the acrylic resin particles (B) contained in the aqueous dispersion (C) is the particle size at 50% cumulative particle volume relative to the total particle volume in the particle distribution obtained using a laser diffraction particle size distribution analyzer.

The D10 value in the particle size distribution of the acrylic resin particles (B) is preferably 1 to 70 μm, more preferably 1 to 50 μm, still more preferably 1 to 30 μm, and further preferably 1 to 15 μm, and may be 1 to 10 μm. This range of the D10 value ensures that the stability of the aqueous dispersion (C) will be enhanced, and further ensures that the acrylic resin particles (B) will attach favorably to the raw pellets of the acrylic block copolymer (A), and consequently the pellets (D) described later will attain excellent antiblocking properties. Further, the adhesive composition obtained by melt kneading the pellets (D) will attain high transparency and good adhesive performance. The D10 value in the particle size distribution of the acrylic resin particles (B) contained in the aqueous dispersion (C) is the particle size at 10% cumulative particle volume relative to the total particle volume in the particle distribution obtained using a laser diffraction particle size distribution analyzer.

The D90 value in the particle size distribution of the acrylic resin particles (B) is preferably 1 to 100 μm, more preferably 1 to 70 μm, still more preferably 1 to 50 μm, and further preferably 1 to 35 μm, and may be 1 to 20 μm. This range of the D90 value ensures that the acrylic resin particles (B) will attach favorably to the raw pellets of the acrylic block copolymer (A), and further ensures that the stability of the aqueous dispersion (C) will be enhanced. As a result of the acrylic resin particles (B) having attached favorably to the raw pellets of the acrylic block copolymer (A), the pellets (D) described later attain excellent antiblocking properties. Further, the adhesive composition obtained by melt kneading the pellets (D) attains high transparency and good adhesive performance. The D90 value in the particle size distribution of the acrylic resin particles (B) contained in the aqueous dispersion (C) is the particle size at 90% cumulative particle volume relative to the total particle volume in the particle distribution obtained using a laser diffraction particle size distribution analyzer.

The solid concentration of the acrylic resin particles (B) in the aqueous dispersion (C) may be selected appropriately in consideration of factors such as handleability and stability, but is preferably 0.05 to 2.0 mass %, more preferably 0.1 to 1.0 mass %, and still more preferably 0.3 to 0.8 mass %.

The aqueous dispersion (C) contains no surfactants. If the aqueous dispersion (C) contains a surfactant, the stability of the acrylic resin particles (B) in the aqueous dispersion (C) is enhanced. However, the presence of a surfactant tends to deteriorate the adhesion of the acrylic resin particles (B) to the raw pellets of the acrylic block copolymer (A). Further, froths are generated during steps, and consequently the production efficiency tends to be lowered. If the aqueous dispersion (C) contains a surfactant, further, the surfactant will remain on the obtained pellets that include the acrylic block copolymer (A) even after the pellets are cleaned of water, and thus may sometimes adversely affect the inherent characteristics (for example, transparency) of the acrylic block copolymer (A) and may sometimes cause a decrease in the performance of the adhesive composition that is obtained. Therefore, the absence of any surfactants in the aqueous dispersion (C) is critical.

To reduce the probability of adverse effects on the inherent characteristics of the acrylic block copolymer (A), it is desirable that the aqueous dispersion (C) be free from protective colloid components such as water-soluble cellulose derivatives, and water-soluble thickeners formed of water-soluble polymers.

The aqueous dispersion (C) may be produced by any method without limitation. For example, it may be prepared as described below.

In a specific production method, an aqueous dispersion (C-1) may be produced by grinding an acrylic resin into a predetermined particle size distribution by a bead mill wet grinding method using water as a solvent, thereby recovering the particles as an aqueous dispersion, and diluting the aqueous dispersion thus obtained. If the solid concentration in the aqueous dispersion is too high during the wet grinding operation, the viscosity is so increased that the operation is hindered. Thus, the solid concentration is appropriately 30 mass % or less. Further, the acrylic resin subjected to wet grinding is preferably primarily pulverized beforehand by a dry grinding method such as an ACM pulverizer or a counter jet mill. More preferably, the acrylic resin subjected to dry grinding has a bead shape of about 300 μm size. Further, an aqueous dispersion (C-2) may be produced by grinding an acrylic resin into a predetermined particle size distribution by a dry grinding method such as an ACM pulverizer or a counter jet mill, and dispersing the ground acrylic resin particles (B) into water.

[Step (1)]

A production method of the present invention includes a step (1) of bringing the raw pellets of the acrylic block copolymer (A) into contact with the aqueous dispersion (C) containing the acrylic resin particles (B) and no surfactants.

The raw pellets of the acrylic block copolymer (A) may be brought into contact with the aqueous dispersion (C) in any manner without limitation. For example, the aqueous dispersion (C) may be sprayed to the raw pellets of the acrylic block copolymer (A), or the raw pellets of the acrylic block copolymer (A) may be added to the aqueous dispersion (C).

For example, the aqueous dispersion (C) may be sprayed in such a manner that the raw pellets are arranged on a transfer device such as a conveyor and are passed through a sprayer while continuously spraying the aqueous dispersion (C) thereto.

For example, the raw pellets of the acrylic block copolymer (A) may be added to the aqueous dispersion (C) in such a manner that the aqueous dispersion (C) and the raw pellets are charged into a mixing tank equipped with a stirrer and are mixed together at a temperature ranging from 0° C. to the boiling point of the solvent contained in the aqueous dispersion (C) for a predetermined amount of time, and the pellets and the aqueous dispersion (C) are separated from each other by filtration or the like.

Of the manners described above, the contact is preferably made by adding the raw pellets of the acrylic block copolymer (A) into the aqueous dispersion (C) for reasons such as because the pellets can be rendered antiblocking stably.

From the point of view of adhesion, the temperature of the aqueous dispersion (C) in the step (1) is preferably 10 to 80° C., and more preferably 30 to 60° C.

[Step (2)]

The raw pellets resulting from the step (1) bear the aqueous dispersion (C) on the surface thereof. The production method of the present invention includes, after the step (1), a step (2) of removing water of the aqueous dispersion (C) attached to the surface of the pellets and thereby obtaining pellets (D).

The water removal may be performed in any manner without limitation. For example, water of the aqueous dispersion (C) attached to the pellet surface may be removed by air blowing or blowing hot air as required. Through the step (2) described above, pellets (D) may be obtained in which the acrylic resin particles (B) attach to the surface of the raw pellets of the acrylic block copolymer (A).

[Step (2')]

When, for example, the pellets (D) are packaged as a final product in a downstream manufacturing system, there will be no or little pellets remaining in the packaging system due to the blocking tendency of the raw pellets. It is, however, often the case that the pellets as a final product are stored as such for a relatively long time until they are actually used afterward (for example, until they are melted and shaped or are formed into an adhesive). To ensure that the pellets will exhibit higher antiblocking effects, the step (2) may be followed by a step (2') of bringing additional acrylic resin particles (B) into contact with the pellets (D) and thereby obtaining pellets (D').

The acrylic resin particles (B) may be brought into contact with the pellets (D) in any manner without limitation. For example, the pellets (D) and dry-ground acrylic resin particles (B) may be mixed with each other directly. Examples of the direct mixing devices include horizontal cylindrical mixers, twin-cylinder mixers, double conical mixers, ribbon mixers, conical screw mixers, high-speed flow type mixers, rotary disk type mixers, air flow stirring mixers, gravitational dropping mixers and stirring mixers. The addition of the step (2') affords pellets (D') that attain further enhanced antiblocking effects.

[Step (3)]

The laminate production method of the present invention includes a step (3) of preparing an adhesive composition using an adhesive feedstock including the pellets (D) from the step (2), and extruding the adhesive composition to form an adhesive layer and thereby producing a laminate including the adhesive layer and a substrate layer. As will be described later, the adhesive composition may be prepared by melt kneading of an adhesive feedstock including the pellets (D). The adhesive feedstock includes the pellets (D) and may consist solely of the pellets (D). The lamination of an adhesive layer may be performed by extruding both an adhesive layer including the adhesive composition, and a substrate layer.

[Step (3')]

In the case where the laminate production method of the present invention includes the step (2'), a laminate may be produced through a step (3') of preparing an adhesive composition using an adhesive feedstock including the pellets (D') from the step (2'), and extruding the adhesive composition to form an adhesive layer and thereby producing a laminate including the adhesive layer and a substrate layer. The step (3') may be such that an adhesive composition is prepared using an adhesive feedstock including a mixture of the pellets (D') from the step (2') and the pellets (D) from the step (2), and the adhesive composition is extruded to form an adhesive layer and thereby a laminate including the adhesive layer and a substrate layer is produced. As will be described later, the adhesive composition may be prepared by melt kneading of an adhesive feedstock including the pellets (D') or the pellets (D) and (D'). The adhesive feedstock includes the pellets (D') or the pellets (D) and (D'), and may consist solely of the pellets (D') or the pellets (D) and (D'). The lamination of an adhesive layer may be performed by extruding both an adhesive layer including the adhesive composition, and a substrate layer.

(Adhesive Compositions)

The adhesive composition used in the present invention is obtained using an adhesive feedstock including the pellets (D) from the step (2) and/or the pellets (D') from the step (2'). For example, the adhesive composition is obtained by melt kneading of an adhesive feedstock including these pellets. Further, the adhesive composition used in the present invention may include a tackifier resin as required. The incorporation of a tackifier resin enhances adhesion, tackiness and compatibility. In a more preferred embodiment, the adhesive composition used in the present invention does not include a plasticizer described later.

The tackifier resin that is optionally used is not particularly limited and may be any tackifier resin conventionally used in adhesives. Examples thereof include rosin resins (such as rosins, rosin derivatives and hydrogenated rosin derivatives), terpene resins, terpene phenol resins, (hydrogenated) petroleum resins, styrene resins, xylene resins, hydrogenated aromatic copolymers, phenol resins and coumarone-indene resins.

The rosin resins in the present invention are amber and amorphous natural resins obtained from pine and are chiefly composed of a mixture of abietic acid and isomers thereof. By making use of the reactivity of abietic acid or isomers thereof, the rosin resins may be modified by esterification, polymerization, hydrogenation and the like. Examples thereof include unmodified rosins (such as, for example, tall rosin, gum rosin and wood rosin), and modified rosins such as polymerized rosins, disproportionated rosins, hydrogenated rosins, maleic acid-modified rosins, fumaric acid-modified rosins, and esters thereof (such as, for example, glycerol esters, pentaerythritol esters, methyl esters, ethyl esters, butyl esters and ethylene glycol esters) which may be further hydrogenated (hereinafter, also written as hydrogenated rosin esters). In particular, from the points of view of heat resistance and discoloration resistance, hydrogenated rosin esters may be preferably used.

The terpene resins in the present invention are oligomers obtained by polymerizing raw materials including terpene monomers. The oligomers thus obtained may be modified, for example, hydrogenated. Such modified oligomers are also included in the terpene resins. Terpenes generally indicate polymers of isoprene ($C_5H_8$) and are classified into monoterpene ($C_{10}H_{16}$), sesquiterpene ($C_{15}H_{24}$), diterpene ($C_{20}H_{32}$) and the like. The terpene monomers are monomers which have these structures as base skeletons. Examples thereof include α-pinene, β-pinene, dipentene, limonene, myrcene, alloocimene, ocimene, α-phellandrene. α-terpinene, γ-terpinene, terpinolene, 1,8-cineole, 1,4-cineole, α-terpineol, β-terpineol, γ-terpineol, sabinene, paramenthadienes and carenes. The raw materials including terpene monomers may include other monomers copolymerizable with the terpene monomers. Examples of such additional monomers include coumarone monomers such as benzofuran ($C_8H_6O$); vinyl aromatic compounds such as styrene, α-methylstyrene, vinyltoluene, divinyltoluene and 2-phenyl-2-butene; and phenolic monomers such as phenol, cresol, xylenol, propylphenol, nolylphenol, hydroquinone, resorcinol, methoxyphenol, bromophenol, bisphenol A and bisphenol F. Examples of the oligomers obtained by polymerizing raw materials including terpene monomers and additional copolymerizable monomers include terpene phenol resins. The oligomers thus obtained may be modified, for example, hydrogenated. Such modified oligomers are also included in the terpene resins.

The (hydrogenated) petroleum resins in the present invention are oligomers obtained by polymerizing a raw material including a $C_5$ fraction, a $C_9$ fraction, a component (s) purified from a $C_5$ fraction, a component(s) purified from a $C_9$ fraction, or a mixture of these fractions or purified components. The oligomers thus obtained may be modified, for example, hydrogenated. Such modified oligomers are also included in the (hydrogenated) petroleum resins. The $C_5$ fraction usually includes cyclopentadiene, dicyclopentadiene, isoprene, 1,3-pentadiene, 2-methyl-1-butene, 2-methyl-2-butene, 1-pentene, 2-pentene and cyclopentene. The $C_9$ fraction usually includes styrene, allylbenzene, α-methylstyrene, vinyltoluene, β-methylstyrene and indene. The $C_9$ fraction sometimes includes small amounts of a $C_8$ fraction and a $C_{10}$ fraction.

The (hydrogenated) petroleum resins are largely classified into $C_5$ resins obtained from a $C_5$ fraction or a component(s) purified therefrom, $C_9$ resins obtained from a $C_9$ fraction or a component(s) purified therefrom, and $C_5$-$C_9$ copolymer resins obtained from a mixture of a $C_5$ fraction or a component(s) purified therefrom, and a $C_9$ fraction or a component(s) purified therefrom. Of these resins, hydrogenated petroleum resins may be preferably used from the points of view of heat resistance and discoloration resistance.

In the present invention, the aromatic hydrocarbon resins such as styrene resins, xylene resins, hydrogenated aromatic copolymers and phenol resins are oligomers obtained by polymerizing a raw material including, for example, styrene, α-methyl styrene, vinyltoluene, β-methylstyrene, divinyltoluene, 2-phenyl-2-butene, methoxystyrene, t-butylstyrene, chlorostyrene, indene, methylindene, phenol, cresol, xylenol, propylphenol, nolylphenol, hydroquinone, resorcin, methoxyphenol, bromophenol, bisphenol A, bisphenol F or a mixture thereof. The oligomers thus obtained may be modified, for example, hydrogenated. Examples further include coumarone-indene resins. Of these resins, styrene resins may be preferably used from the points of view of compatibility, heat resistance and discoloration resistance.

The tackifier resins may be used singly, or two or more may be used in combination. When two or more tackifier resins are contained, the adhesive composition that is obtained advantageously attains an excellent balance between adhesive strength and tackiness. To ensure that high adhesive strength is obtained, the tackifier resin is preferably one having a softening point of 50 to 160° C.

The content of the tackifier resin is 1 to 190 parts by mass with respect to 100 parts by mass of the acrylic block copolymer (A). This content of the tackifier resin ensures that the adhesive composition that is obtained will attain an excellent balance among adhesive strength, tackiness and cohesive force. To attain higher levels of adhesive strength, tackiness and cohesive force, the content of the tackifier resin is more preferably 3 to 170 parts by mass with respect to 100 parts by mass of the acrylic block copolymer (A).

The adhesive composition used in the present invention may include a plasticizer. The addition of a plasticizer imparts an excellent balance between adhesive strength and tackiness to the adhesive composition that is obtained, and generally further results in a decrease in overall cost.

Examples of the plasticizers include phthalic acid esters such as dibutyl phthalate, di-n-octyl phthalate, bis(2-ethylhexyl) phthalate, bis(2-ethylhexyl) terephthalate, di-n-decyl phthalate and diisodecyl phthalate; adipic acid esters such as bis(2-ethylhexyl) adipate, diisodecyl adipate and di-n-octyl adipate; sebacic acid esters such as bis(2-ethylhexyl) sebacate and di-n-butyl sebacate; azelaic acid esters such as bis(2-ethylhexyl) azelate; citric acid esters such as tributyl acetylcitrate; paraffins such as chlorinated paraffins; glycols such as polypropylene glycol; epoxy-modified plant oils such as epoxidized soybean oil and epoxidized linseed oil; phosphoric acid esters such as trioctyl phosphate and triphenyl phosphate; phosphorous acid esters such as triphenyl phosphite; ester oligomers such as ester of adipic acid with 1,3-butylene glycol, and ester of benzoic acid with dipropylene glycol; low-molecular polymers such as low-molecular polybutene, low-molecular polyisobutylene and low-molecular polyisoprene; acrylic oligomers such as poly-n-butyl acrylate and poly-2-ethylhexyl acrylate; paraffin oils such as Diana Process Oil PW series (manufactured by Idemitsu Kosan Co., Ltd.), and SUNPURE LW70 and P series (manufactured by JAPAN SUN OIL COMPANY, LTD.); naphthene oils such as SUNPURE N90 and NX90, and SUNTHENE series (manufactured by JAPAN SUN OIL COMPANY, LTD.); and aroma oils such as JSO AROMA 790 (manufactured by JAPAN SUN OIL COMPANY, LTD.) and Vivatec 500 (manufactured by H & R). The plasticizers may be used singly, or two or more may be used in combination.

The content of the plasticizer is preferably not more than 80 parts by mass, more preferably not more than 70 parts by mass, and still more preferably not more than 60 parts by mass with respect to 100 parts by mass of the acrylic block copolymer (A). When the content of the plasticizer is in this range, the adhesive composition that is obtained attains excellent transparency and bleed resistance. To take advantage of the effect of adding the plasticizer to the adhesive composition, it is usually desirable that the content thereof be not less than 5 parts by mass with respect to 100 parts by mass of the acrylic block copolymer (A).

The adhesive composition used in the present invention may contain other polymers, and additives such as softeners, heat stabilizers, light stabilizers, antistatic agents, flame retardants, foaming agents, colorants, dyes, refractive index modifiers, fillers, curing agents and antiblocking agents, while still achieving the advantageous effects of the invention. These additional polymers and additives may be used singly, or two or more may be used in combination.

Examples of the additional polymers include acrylic resins such as polymethyl methacrylate and (meth)acrylic acid ester copolymers; olefin resins such as polyethylene, ethylene-vinyl acetate copolymer, polypropylene, polybutene-1, poly-4-methylpentene-1 and polynorbornene; ethylene ionomers; styrene resins such as polystyrene, styrene-maleic anhydride copolymer, high-impact polystyrene, AS resins, ABS resins, AES resins, AAS resins, ACS resins and MBS resins; styrene-methyl methacrylate copolymer; polyester resins such as polyethylene terephthalate, polybutylene terephthalate and polylactic acid; polyamides such as nylon 6, nylon 66 and polyamide elastomers; polycarbonates; polyvinyl chloride; polyvinylidene chloride; polyvinyl alcohols; ethylene-vinyl alcohol copolymers; polyacetals; polyvinylidene fluoride; polyurethanes; modified polyphenylene ethers; polyphenylene sulfide; silicone rubber-modified resins; acrylic rubbers; silicone rubbers; styrenic thermoplastic elastomers such as SEPS, SEBS and SIS; and olefin rubbers such as IR, EPR and EPDM. Of these, from the point of view of the compatibility with the acrylic block copolymer (A) contained in the adhesive composition, acrylic resins, ethylene-vinyl acetate copolymer, AS resins, polylactic acid, polyvinylidene fluoride and styrenic thermoplastic elastomers are preferable, and (meth)acrylic acid ester copolymers and styrenic thermoplastic elastomers are more preferable.

Examples of the fillers include inorganic fibers such as glass fibers and carbon fibers, and organic fibers; inorganic fillers such as calcium carbonate, talc, titanium oxide, silica, clay, barium sulfate and magnesium carbonate; and carbon blacks. The addition of inorganic fibers or organic fibers imparts durability to the adhesive composition that is obtained. The incorporation of inorganic fillers makes the obtainable adhesive composition resistant to heat and weathering.

The addition of a curing agent allows the adhesive composition in the invention to be suitably used as a curable adhesive. The curing agent may be a light curing agent such as a UV curing agent, or a heat curing agent, with examples including benzoins, benzoin ethers, benzophenones, anthraquinones, benzils, acetophenones and diacetyls. Specific examples include benzoin, α-methylolbenzoin, α-t-butylbenzoin, benzoin methyl ether, benzoin ethyl ether, benzoin-n-propyl ether, benzoin isopropyl ether, benzoin isobutyl ether, α-methylolbenzoin methyl ether, α-methoxybenzoin methyl ether, benzoin phenyl ether, benzophenone, 9,10-anthraquinone, 2-ethyl-9,10-anthraquinone, benzil, 2,2-dimethoxy-1,2-diphenylethan-1-one (2,2-dimethoxy-2-phenylacetophenone) and diacetyl. The curing agents may be used singly, or two or more may be used in combination.

To increase the effect of the curing agent, the adhesive composition used in the present invention may further include monomers, for example, acrylic acid, methacrylic acid, α-cyanoacrylic acid, α-halogenated acrylic acid, crotonic acid, cinnamic acid, sorbic acid, maleic acid, itaconic acid, and esters such as acrylic acid esters, methacrylic acid esters, crotonic acid esters and maleic acid esters; acrylamide; methacrylamide; acrylamide derivatives such as N-methylol acrylamide, N-hydroxyethyl acrylamide and N,N-(dihydroxyethyl) acrylamide; methacrylamide derivatives such as N-methylol methacrylamide, N-hydroxyethyl methacrylamide and N, N-(dihydroxyethyl) methacrylamide; vinyl esters; vinyl ethers; mono-N-vinyl derivatives; and styrene derivatives; and oligomers including these monomers as structural components. To attain higher durability, it is preferable to add esters such as acrylic acid esters, methacrylic acid esters, crotonic acid esters and maleic acid esters; vinyl ethers; styrene derivatives; and oligomers including these monomers as structural components. In addition to these monomers, crosslinking agents including a difunctional or polyfunctional monomer or oligomer may be added.

The adhesive composition used in the present invention may be produced by any method without limitation. For example, the composition may be produced by mixing (melt kneading) the components with use of a known mixer or kneader such as a kneader ruder, an extruder, a mixing roll or a Banbury mixer, usually at a temperature in the range of 100 to 250° C. The adhesive composition thus obtained may be collected in various forms such as pellets or blocks appropriately in accordance with the manner in which the composition is extruded into an adhesive layer described later. From the points of view of processability and handleability, it is preferable that the melt viscosity be low. On the other hand, a high melt viscosity is preferable for the adhesive layer to concurrently satisfy adhesive performance and high holding power (creep resistance).

<Laminate>

In the step (3) or (3') in the present invention, the adhesive composition is extruded to form an adhesive layer on a substrate layer, and thereby a laminate including the adhesive layer and the substrate layer is produced. Some example extrusion methods which may be used are T-die extrusion, hot melt coating, blown-film extrusion and calendering, with T-die extrusion and hot melt coating being particularly preferable. Such extrusion methods are advantageous in that a laminate may be fabricated without the use of a solvent and the production facility is relatively simple. Further, the cost for the production of laminates tends to be reduced by virtue of simplified production steps.

For example, the T-die extrusion adopted to produce the laminate may be suitably an extrusion laminating process in which the adhesive composition is thermally melted and laminated onto a substrate layer to form an adhesive layer, or a coextrusion process in which the adhesive composition and a substrate are both thermally melted and extruded, typically at the same time, to form a laminate including an adhesive layer and a substrate layer. Incidentally, the adhesive composition that is shaped by T-die extrusion may be pellets of the adhesive composition obtained beforehand by kneading, or may be a dry blend of the pellets (D) and/or the pellets (D') of the present invention and a tackifier resin.

In the extrusion laminating process, the adhesive composition is preferably extruded from a die at a temperature of 180 to 320° C. in order to attain good adhesion with respect to the substrate layer.

In the production of the laminate of the present invention, the pellets (D) or the pellets (D') that have been prepared may be left as such for a certain amount of time, for example, may be stored or transported to another step, and thereafter the pellets (D) or the pellets (D') may be processed as described above to form a laminate.

Examples of the substrate layers include films and sheets of synthetic polymer compounds, metal foils, papers, cellophanes, nonwoven fabrics and woven fabrics. Examples of the synthetic polymer compounds include, but are not limited to, polyethylene terephthalate, polyethylene naphthalate, triacetylcellulose, polyamides, polyvinyl alcohols, polycarbonates, cycloolefin resins, styrene-methyl methacrylate copolymer, polyvinyl chloride, ethylene-vinyl acetate copolymer, polymethyl methacrylate, polyethylene, polypropylene, and mixtures of two or more of these polymers. The synthetic polymer compounds may be copolymers obtained by copolymerizing various monomers. Such films and sheets may be further coated by aluminum deposition, alumina deposition or silicon dioxide deposition. Further, the films and sheets of these synthetic polymer compounds may be further printed with urethane inks or the like.

Examples of the metal foils include aluminum foil and copper foil. Examples of the papers include kraft paper, woodfree paper and glassine paper. Examples of the nonwoven fabrics include nonwoven fabrics made of such materials as aramid fibers, glass fibers, cellulose fibers, nylon fibers, vinylon fibers, polyester fibers, polyolefin fibers and rayon fibers. Examples of the woven fabrics include woven fabrics made of such materials as aramid fibers, glass fibers, cellulose fibers, nylon fibers, vinylon fibers, polyester fibers, polyolefin fibers and rayon fibers.

Examples of the configurations of the laminates include, but are not limited to, a two-layered configuration including an adhesive layer made of the inventive adhesive composition and a substrate layer, a three-layered configuration including two substrate layers and an adhesive layer made of the inventive adhesive composition (substrate layer/adhesive layer/substrate layer), a four-layered configuration including a substrate layer, two adhesive layers (a) and (b) made of different types of the inventive adhesive compositions, and a substrate layer (substrate layer/adhesive layer (a)/adhesive layer (b)/substrate layer), a four-layered configuration including a substrate layer, an adhesive layer (a) made of the inventive adhesive composition, an adhesive layer (c) made of a material outside the scope of the invention, and a substrate layer (substrate layer/adhesive layer (a)/adhesive layer (c)/substrate layer), and a five-layered configuration including three substrate layers and two adhesive layers made of the inventive adhesive composition (substrate layer/adhesive layer/substrate layer/adhesive layer/substrate layer).

The thickness ratio of the substrate layer to the adhesive layer in the laminate is not particularly limited. From the points of view of the adhesion, durability and handleability of the obtainable laminate, it is preferable that substrate layer/adhesive layer=1/1000 to 1000/1, and it is more preferable that the ratio be in the range of 1/200 to 200/1. The coating mass of the adhesive composition may be, for example, 5 to 200 g/m$^2$.

The bonding surface of the substrate layer on which the adhesive layer will be placed in contact may be oxidized beforehand with air or ozone gas. To increase the adhesion with respect to the adhesive layer, the bonding surface of the substrate layer may be treated by known surface treatment such as anchor coating treatment, corona discharge treatment, flame treatment or plasma treatment. Further, an anchor layer may be formed by applying an adhesive resin or the like onto the surface of at least one of the adhesive layer and the substrate layer.

Examples of the resins used in the anchor layers include ethylene-vinyl acetate copolymer, ethylene-methyl methacrylate copolymer, ionomers, block copolymers (such as, for example, styrene triblock copolymers such as SIS and SBS, and diblock copolymers), ethylene-acrylic acid copolymer and ethylene-methacrylic acid copolymer. There may be one, or two or more anchor layers.

The anchor layer may be formed by any method without limitation. For example, an anchor layer may be formed by applying a solution of the above resin onto the substrate layer, or by thermally melting an anchoring composition which contains components including the above resin and applying the melt through a T-die or the like to form an anchor layer on the surface of the substrate layer.

The coextrusion process may be a feedblock process or a multimanifold process. The process can produce a multilayered structure such as a bilaminar structure including two dissimilar layers consisting of a substrate layer and an adhesive layer, or a trilaminar structure including three dissimilar layers consisting of a substrate layer, an adhesive layer and an intermediate layer in between.

The substrate layer formed in the coextrusion process may be a synthetic polymer compound. For example, the substrate layer is preferably formed from a polyolefin material or the like.

Examples of the polyolefin materials include low-density polyethylene, medium-density polyethylene, high-density polyethylene, linear low-density polyethylene, ethylene-α-olefin copolymers, ethylene-vinyl acetate copolymer, ethylene-ethyl acrylate copolymer, ethylene-methyl methacrylate copolymer, ethylene-n-butyl acrylate copolymer, and polypropylenes (homopolymers, random copolymers and block copolymers). The polyolefin materials may be used singly or may be combined appropriately to forma mixture or a composition. In particular, a polypropylene in the form of a block copolymer is preferable as the material for the substrate layer.

Where necessary, the substrate layer may contain additives such as pigments, antioxidants, stabilizers and UV absorbers. Further, the substrate layer is not limited to a single layer, and may be formed of a plurality of layers. For example, the total thickness of the substrate layer composed of a single layer or a plurality of layers is preferably not less than 20 μm and not more than 100 μm.

Further, the laminate may have an intermediate layer. Some example resins that may be used as the intermediate layers are ethylene-vinyl acetate copolymer, ethylene-methyl methacrylate copolymer, ionomers, block copolymers (such as, for example, styrene triblock copolymers such as SIS and SBS, and diblock copolymers), ethylene-acrylic acid copolymer and ethylene-methacrylic acid copolymer. There may be one, or two or more intermediate layers. The intermediate layers may be formed concurrently with the substrate layer and the adhesive layer by coextrusion.

The laminate may be fabricated by a hot melt coating method in which the adhesive composition obtained as described hereinabove is thermally melted with a melter or the like and the melt is applied onto the substrate layer.

Some example coating techniques are open wheel techniques, closed gun techniques and direct coating techniques, with open wheel techniques and direct coating techniques being suitably used. In the case where the adhesive composition has a high melt viscosity, for example, a melt viscosity (a melt viscosity at 180° C.) of more than 20,000 mPa·s, the composition is to be thermally melted at a higher temperature. Thus, from the points of view of the thickness control and uniformity of the adhesive layer and the heat resistance required of the support, a direct coating technique is preferable in which a hot melt is applied through a T-die onto the support in a contact-free manner.

The configurations of the substrate layers (including surface treatment, etc.) and the adhesive layers, the thickness ratio of the substrate layer to the adhesive layer in the laminate, the coating mass, and other conditions may be suitably the same as those illustrated hereinabove in the description of the extrusion laminating process.

The laminates of the present invention may be used in various applications. Examples of such applications include adhesive tapes and adhesive films for surface protection, masking, wrapping/packaging, office uses, labels, decoration/display, book binding, dicing tapes, medical/sanitary uses, prevention of glass scattering, electrical insulation, holding and fixing of electronic equipment, production of semiconductors, optical display films, adhesive optical films, shielding of electromagnetic waves, and sealing materials of electric and electronic parts. Specific examples are given below.

The adhesive tapes or films for surface protection may be used for various materials such as metals, plastics, rubbers and wood, and specifically may be used for the surface protection of coating surfaces, metals during plastic working or deep drawing, automobile parts and optical parts. Examples of the automobile parts include coated exterior plates, wheels, mirrors, windows, lights and light covers. Examples of the optical parts include various image display devices such as liquid crystal displays, organic EL displays, plasma displays and field emission displays; optical disk constitutional films such as polarizing films, polarizing plates, retardation plates, light guide panels, diffusion plates and DVD; and fine coat faceplates for electronic/optical uses.

Exemplary uses for masking applications include masking during the manufacturing of printed wiring boards or flexible printed wiring boards; masking during a plating or soldering treatment for electronic equipment; and masking during the manufacturing of vehicles such as automobiles, during the coating of vehicles and buildings, during textile printing, and during trimming of civil engineering works.

Exemplary uses for wrapping/packaging applications include heavy material packaging, packaging for export, sealing of corrugated fiberboard boxes and sealing of cans. Examples of office uses include general use for office, and uses for sealing, mending of books, drawing and memos. Exemplary uses for labels include price displays, merchandise displays, tags, POP, stickers, stripes, nameplates, decoration and advertisement.

Examples of the labels include labels having such substrate layers as, for example, papers such as paper, converted paper (paper subjected to aluminum deposition, aluminum lamination, varnishing, resin treatment or the like) and synthetic paper; and films made of cellophane, plastic materials, fabrics, wood or metals. Examples of the substrate layers include woodfree paper, art paper, cast-coated paper, thermal paper, foil paper, polyethylene terephthalate film, polyvinyl chloride film, OPP film, polylactic acid film, synthetic paper, thermal synthetic paper and overlaminate film.

Some example adherends for the labels include plastic products such as plastic bottles and foamed plastic cases; paper or corrugated fiberboard products such as corrugated fiberboard boxes; glass products such as glass bottles; metal products; and products made of other inorganic materials such as ceramics.

Exemplary uses for decoration/display applications include danger display seals, line tapes, wiring markings, after-glow luminous adhesive tapes and reflecting sheets.

Examples of the applications as adhesive optical films include adhesive layers formed on at least part or the entirety of one or both sides of such optical films as polarizing films, polarizing plates, retardation films, viewing angle enlarging films, luminance improving films, antireflection films, antiglare films, color filters, light guide panels, diffusion films, prism sheets, electromagnetic wave shielding films, near infrared absorbing films, functional composite optical films, films for ITO lamination, impact resistance imparting films, and visibility improving films. The adhesive optical films may be protective films used for the protection of the surface of the above optical films. The adhesive optical films are suitably used in various image display devices such as liquid crystal display devices, PDP, organic EL display devices, electronic papers, game machines and mobile terminals.

Exemplary uses for electrical insulation include protective covering or insulation of coils, and layer insulation such as motor/transformer layer insulation. Exemplary uses for holding and fixing of electrical equipment include carrier tapes, packaging, fixing of cathode ray tubes, splicing and rib reinforcement. Exemplary uses for the production of semiconductors include protection of silicon wafers.

Examples of medical and sanitary uses include uses for percutaneous absorbent drugs, such as analgesic anti-inflammatory agents (plasters, poultices), plasters for cold, antipruritic patches and keratin softening agents; uses for various tapes, such as first-aid plasters (containing germicides), surgical dressings/surgical tapes, plasters, hemostatic tapes, tapes for human waste disposal devices (artificial anus fixing tapes), tapes for stitching, antibacterial tapes, fixing tapings, self-adhesive bandages, adhesive tapes for oral mucosa, tapes for sporting, and depilatory tapes; uses for beauty, such as facial packs, moistening sheets for skin round the eye and keratin peel packs; binding uses in sanitary materials such as diapers and sheets for pets; cooling sheets, pocket body warmers, and uses for dust proofing, waterproofing and noxious insect capture.

Exemplary uses for sealing materials of electronic/electric parts include liquid crystal displays, organic EL displays, organic EL lights and solar cells.

EXAMPLES

The present invention will be described in detail based on Examples hereinbelow. However, it should be construed that the scope of the present invention is not limited thereto. In Examples and Comparative Examples, properties were measured or evaluated by the following methods.

(Weight Average Molecular Weight (Mw), Number Average Molecular Weight (Mn), and Molecular Weight Distribution (Mw/Mn))

The weight average molecular weight, number average molecular weight and molecular weight distribution of acrylic block copolymers were determined as polystyrene-equivalent molecular weights by gel permeation chromatography (hereinafter, abbreviated as GPC). The details are as follows.

Device: GPC device "HLC-8020" manufactured by TOSOH CORPORATION
Separation columns: "TSKgel GMHXL", "G4000HXL" and "G5000HXL" manufactured by TOSOH CORPORATION were connected in series.
Eluent: Tetrahydrofuran
Eluent flow rate: 1.0 ml/min
Column temperature: 40° C.
Detection method: Differential refractive index (RI)

(Proportions of Polymer Blocks)

The proportions of polymer blocks in an acrylic block copolymer were determined by $^1$H-NMR ($^1$H-nuclear magnetic resonance) measurement. The details are as follows.

Device: Nuclear magnetic resonance apparatus "JNM-LA400" manufactured by JEOL Ltd.
Deuterated solvent: Deuterated chloroform (Particle Size Distribution (D10 Value, D50 Value and D90 Value) of Acrylic Resin Particles in Aqueous Dispersion)

The particle size distribution (D10 value, D50 value and D90 value) of acrylic resin particles in an aqueous dispersion was determined using a laser diffraction particle size distribution analyzer. The details are as follows.

Device: Laser diffraction scattering type particle size distribution analyzer "MICROTRACK MT3000II" manufactured by MicrotracBEL Corp.

In Production Examples 8 and 9, the average particle sizes disclosed by the manufacturers are described. In Production Examples 10 and 11, the values according to Example 1 (ALFLOW H50ES) and Example 4 (ALFLOW H50T) of JP-A-2016-188327 are described.

(Amount of Attachment of Acrylic Resin Particles (B) or Antiblocking Agent)

The amount of acrylic resin particles (B) or an antiblocking agent attached to pellets was calculated from the total mass of the pellets obtained and the change in concentration of an aqueous dispersion.

Amount of attachment [ppm]={(Change in concentration [ppm] of aqueous dispersion)×(Total mass [g] of aqueous dispersion)}/(Total mass [g] of pellets)

(Processability During Extrusion (Antiblocking Properties of Pellets))

In an extrusion laminating process or a coextrusion process, the presence or absence of blocking was determined when pellets were charged into an extruder through a hopper.

(Blocking in Extruder)
CC: The pellets had been blocked and could not be stably supplied to the extruder.
AA: The pellets had not been blocked and were supplied to the extruder at a stable rate.

(Blocking During Supply to Hopper)
BB: The pellets had been blocked when supplied to the hopper.
AA: The pellets had not been blocked and were supplied to the hopper at a stable rate.

(Blocking in Kneader)
In a hot melt coating process, the ease of charging was evaluated by determining the presence or absence of blocking when pellets were charged into a kneader.
CC: The pellets had been markedly blocked and a predetermined amount could not be charged into the kneader quickly.
AA: The pellets had not been blocked and a predetermined amount was charged into the kneader quickly.

(Processability During Extrusion (Die Buildup))
The presence or absence of die buildup around a die head was determined after one hour of continuous operation.

(Adhesive Performance (Contamination of Adherend))
An adhesive film obtained in Example or Comparative Example was cut to a width of 10 mm and a length of 100 mm. The cutout from the adhesive film was attached to a glass plate, and a 2 kg roller was reciprocated thereon two times. After the lapse of 24 hours at room temperature, the adhesive film was peeled off and the glass surface was observed. When any adhesive residue was "present" on the glass surface, the adhesive performance was evaluated as tending to contaminate the adherend and as being inferior.

[Synthetic Example 1] [Acrylic Block Copolymer (A1)]

(1) The inside of a 100 L polymerization vessel was purged with nitrogen, and 46.5 kg of toluene and 1.08 kg of 1,2-dimethoxyethane were added at room temperature while performing stirring. Subsequently, 1.60 kg of a toluene solution containing 808.5 mmol of isobutylbis(2,6-di-t-butyl-4-methylphenoxy)aluminum was added, and further 0.06 kg of a sec-butyllithium in cyclohexane solution containing 103.95 mmol of sec-butyllithium was added.

(2) Subsequently, 1.08 kg of methyl methacrylate was added. The reaction solution was yellow at first and became colorless after being stirred at room temperature for 60 minutes.

(3) Subsequently, the internal temperature of the polymerization solution was cooled to −30° C., and 13.53 kg of n-butyl acrylate was added dropwise over a period of 2 hours. After the completion of the dropwise addition, the mixture was stirred at −30° C. for 5 minutes.

(4) Further, 1.49 kg of methyl methacrylate was added, and the mixture was stirred at room temperature overnight.

(5) The polymerization reaction was terminated by the addition of 0.50 kg of methanol. Thereafter, the reaction solution obtained was poured into 495 kg of methanol to precipitate a liquid deposit. Thereafter, the liquid deposit was recovered and dried. Thus, 14.8 kg of an acrylic triblock copolymer (A1) was obtained which had a content of methyl methacrylate units (a content of polymer blocks (a2)) of 16.3 mass %, a weight average molecular weight of 159,000, and a molecular weight distribution (weight average molecular weight/number average molecular weight) of 1.10.

(6) The above procedures (1) to (5) were repeated 10 times. Approximately 150 kg of the acrylic triblock copolymer (A1) was thus obtained.

(7) The acrylic triblock copolymer (A1) obtained was kneaded in a twin-screw extruder ("ZSK-25" manufactured by KRUPP WERNER & PFLEIDERER) and was pelletized with a strand cutter. Raw pellets (A'1) were thus obtained.

[Synthetic Example 2] [Acrylic Block Copolymer (A2)]

(1) The inside of a 100 L polymerization vessel was purged with nitrogen, and 43.4 kg of toluene and 2.17 kg of 1,2-dimethoxyethane were added at room temperature while performing stirring. Subsequently, 4.0 kg of a toluene solution containing 2008.0 mmol of isobutylbis(2,6-di-t-butyl-4-methylphenoxy)aluminum was added, and further 0.14 kg of a sec-butyllithium in cyclohexane solution containing 249.8 mmol of sec-butyllithium was added.

(2) Subsequently, 2.31 kg of methyl methacrylate was added. The reaction solution was yellow at first and became colorless after being stirred at room temperature for 60 minutes.

(3) Subsequently, the internal temperature of the polymerization solution was cooled to −30° C., and 10.49 kg of n-butyl acrylate was added dropwise over a period of 2 hours. After the completion of the dropwise addition, the mixture was stirred at −30° C. for 5 minutes.

(4) Further, 2.19 kg of methyl methacrylate was added, and the mixture was stirred at room temperature overnight.

(5) The polymerization reaction was terminated by the addition of 0.67 kg of methanol. The reaction solution obtained was poured into 500 kg of methanol to precipitate a liquid deposit. Thereafter, the liquid deposit was recovered and dried. Thus, 14.7 kg of an acrylic triblock copolymer (A2) was obtained which had a content of methyl methacrylate units (a content of polymer blocks (a2)) of 30.3 mass %, a weight average molecular weight of 61,000, and a molecular weight distribution of 1.09.

(6) The above procedures (1) to (5) were repeated 10 times. Approximately 150 kg of the acrylic triblock copolymer (A2) was thus obtained.

(7) The acrylic triblock copolymer (A2) obtained was kneaded in a twin-screw extruder ("ZSK-25" manufactured by KRUPP WERNER & PFLEIDERER) and was pelletized with a strand cutter. Raw pellets (A'2) were thus obtained.

[Synthetic Example 3] [Acrylic Block Copolymer (A3)]

(1) A three-way cock was attached to a 3 L three-necked flask, and the inside was purged with nitrogen. Thereafter, while performing stirring at room temperature, the flask was charged with 1409 g of toluene and 32.7 g of 1,2-dimethoxyethane, subsequently charged with 48.6 g of a toluene solution containing 24.5 mmol of isobutylbis(2,6-di-t-butyl-4-methylphenoxy)aluminum, and further charged with 2.55 g of a sec-butyllithium in cyclohexane solution containing 4.35 mmol of sec-butyllithium.

(2) Subsequently, 43.5 g of methyl methacrylate was added. The reaction solution was yellow at first and became colorless after being stirred at room temperature for 60 minutes.

(3) Subsequently, the internal temperature of the polymerization solution was cooled to −30° C., and 360 g of n-butyl acrylate was added dropwise over a period of 2 hours. After the completion of the dropwise addition, the mixture was stirred at −30° C. for 5 minutes.

(4) Further, 61.5 g of methyl methacrylate was added, and the mixture was stirred at room temperature overnight.

(5) The polymerization reaction was terminated by the addition of 15 g of methanol. The reaction solution obtained was poured into 15 kg of methanol to precipitate a liquid deposit. Thereafter, the liquid deposit was recovered and dried. Thus, 450 g of an acrylic triblock copolymer (A3) was obtained which had a content of methyl methacrylate units (a content of polymer blocks (a2)) of 22.5 mass %, a weight average molecular weight of 111,000, and a molecular weight distribution of 1.09.

(6) The acrylic triblock copolymer (A3) obtained was kneaded in a compact twin-screw extruder ("KZW-15" manufactured by TECHNOVEL CORPORATION) and was pelletized with a strand cutter. Raw pellets (A'3) were thus obtained.

[Synthetic Example 4] [Acrylic Block Copolymer (A4)]

(1) A three-way cock was attached to a 3 L three-necked flask, and the inside was purged with nitrogen. Thereafter, while performing stirring at room temperature, the flask was charged with 1409 g of toluene and 32.7 g of 1,2-dimethoxyethane, subsequently charged with 48.6 g of a toluene solution containing 24.5 mmol of isobutylbis(2,6-di-t-butyl-4-methylphenoxy)aluminum, and further charged with 1.50 g of a sec-butyllithium in cyclohexane solution containing 2.55 mmol of sec-butyllithium.

(2) Subsequently, 22.7 g of methyl methacrylate was added. The reaction solution was yellow at first and became colorless after being stirred at room temperature for 60 minutes.

(3) Subsequently, the internal temperature of the polymerization solution was cooled to −30° C., and 434 g of n-butyl acrylate was added dropwise over a period of 2 hours. After the completion of the dropwise addition, the mixture was stirred at −30° C. for 5 minutes.

(4) Further, 29.4 g of methyl methacrylate was added, and the mixture was stirred at room temperature overnight.

(5) The polymerization reaction was terminated by the addition of 15 g of methanol. The reaction solution obtained was poured into 15 kg of methanol to precipitate a liquid deposit. Thereafter, the liquid deposit was recovered and dried. Thus, 440 g of an acrylic triblock copolymer (A4) was obtained which had a content of methyl methacrylate units (a content of polymer blocks (a2)) of 11.0 mass %, a weight average molecular weight of 200,000, and a molecular weight distribution of 1.11.

(6) The acrylic triblock copolymer (A4) obtained was kneaded in a compact twin-screw extruder ("KZW-15" manufactured by TECHNOVEL CORPORATION) and was pelletized with a strand cutter. Raw pellets (A'4) were thus obtained.

[Synthetic Example 5] [Aromatic vinyl block copolymer (M1)]

(1) A pressure vessel with a stirrer that had been purged with nitrogen was charged with 90.9 g of α-methylstyrene, 138 g of cyclohexane, 15.2 g of methylcyclohexane and 3.2 g of tetrahydrofuran. To the mixture liquid, 9.8 ml of sec-butyllithium (1.3 M cyclohexane solution) was added. Polymerization was performed at −10° C. for 3 hours. Three hours after the start of the polymerization, the number average molecular weight (Mn) of poly-α-methylstyrene was 6,600, and the polymerization conversion ratio of α-methylstyrene was 89%.

(2) Next, 23 g of butadiene was added to the reaction mixture liquid. The resultant mixture was stirred at −10° C. for 30 minutes to perform polymerization, and thereafter 930 g of cyclohexane was added. The polymerization conversion ratio of α-methylstyrene at this point was 89%, and the number average molecular weight (GPC measurement, relative to standard polystyrenes) of the polybutadiene block (g1) formed was 3,700. From $^1$H-NMR measurement, the ratio of 1,4-bonding was 19 mol %.

(3) Next, 141.3 g of butadiene was further added to the reaction liquid, and polymerization reaction was performed at 50° C. for 2 hours. In the block copolymer (structure: F-g1-g2) sampled at this stage, the number average molecular weight (Mn) of the polybutadiene block (g2) was 29,800. From $^1$H-NMR measurement, the ratio of 1,4-bonding was 60 mol°.

(4) Subsequently, 12.2 ml of dichlorodimethylsilane (0.5 M toluene solution) was added to the polymerization reaction solution. The resultant mixture was stirred at 50° C. for 1 hour, and thereby a poly-α-methylstyrene-polybutadiene-poly-α-methylstyrene triblock copolymer was obtained. The mixture was analyzed by GPC, and the areas of UV absorption peaks were determined of the coupling product (poly-α-methylstyrene-polybutadiene-poly-α-methylstyrene triblock copolymer: F-g1-g2-X-g2-g1-F; in the formula, X represents a coupling agent residue (—Si(Me)2-), number average molecular weight (Mn)=81,000) and the unreacted block copolymer (poly-α-methylstyrene-polybutadiene block copolymer: F-g1-g2, number average molecular weight (Mn)=41,000). From the ratio of the areas, the coupling efficiency in this process was calculated to be 94 mass %. According to $^1$H-NMR analysis, the content of the poly-α-methyl styrene blocks in the poly-α-methylstyrene-polybutadiene-poly-α-methylstyrene triblock copolymer was 30 mass %, and the ratio of 1,4-bonding in the total polybutadiene blocks, namely, the blocks (g1) and the blocks (g2), was 60 mol %.

(5) In a hydrogen atmosphere, a Ziegler hydrogenation catalyst composed of nickel octylate and triethylaluminum was added to the polymerization reaction solution obtained above. Hydrogenation reaction was performed at a hydrogen pressure of 0.8 MPa and 80° C. for 5 hours. Thus, a hydrogenated product of the poly-α-methylstyrene-polybutadiene-poly-α-methylstyrene triblock copolymer was obtained.

(6) The hydrogenated block copolymer was analyzed by GPC. As a result, the principal component was the hydrogenated product of the poly-α-methylstyrene-polybutadiene-poly-α-methylstyrene triblock copolymer (the coupling product) having a peak top molecular weight (Mt)=81,000, a number average molecular weight (Mn)=78,700, a weight average molecular weight (Mw)=79,500 and Mw/Mn=1.01. From the ratio of the areas of UV (254 nm) absorption peaks according to GPC, it was found that the coupling product represented 94 mass %. Further, $^1$H-NMR measurement showed that the ratio of hydrogenation of the polybutadiene blocks consisting of the blocks (g1) and the blocks (g2) was 99 mol %.

The block structures, weight average molecular weights (Mw), molecular weight distributions (Mw/Mn), and contents of the polymer blocks (a2) in the acrylic block copolymers (A1) to (A4) obtained in Synthetic Examples 1 to 4 are described in Table 1-1. The weight average molecular weight (Mw), molecular weight distribution (Mw/Mn), content of the poly-α-methylstyrene blocks, and hydrogenation ratio in the aromatic vinyl block copolymer (M1) obtained in Synthetic Example 5 are described in Table 1-2.

TABLE 1-1

|  | Syn. Ex. 1 | Syn. Ex. 2 | Syn. Ex. 3 | Syn. Ex. 4 |
|---|---|---|---|---|
| Acrylic block copolymer | (A1) | (A2) | (A3) | (A4) |
| Block structure | a2-a1-a2 | a2-a1-a2 | a2-a1-a2 | a2-a1-a2 |
| Mw of acrylic block copolymer | 159,000 | 61,000 | 111,000 | 200,000 |
| Mw/Mn of acrylic block copolymer | 1.10 | 1.09 | 1.09 | 1.11 |
| Content (mass %) of polymer blocks (a2) | 16.3 | 30.3 | 22.5 | 11.0 |

TABLE 1-2

| | Syn. Ex. 5 |
|---|---|
| Aromatic vinyl block copolymer | (M1) |
| Mw of aromatic vinyl block copolymer | 79,500 |
| Mw/Mn of aromatic vinyl block copolymer | 1.01 |
| Content of poly-α-methylstyrene blocks (mass %, unhydrogenated state) | 30.0 |
| Hydrogenation ratio (mol %) | 99.0 |

Production Example 1

An acrylic resin (content of methyl methacrylate units: 90 mass %, weight average molecular weight: 85,000) was ground with dry grinders described later to give acrylic resin particles (B1) having a D50 value in the ground particle size distribution of 6 μm. The acrylic resin particles (B1) obtained were dispersed in water so that the solid concentration would be 0.5 mass %, thus forming an aqueous dispersion (C-2-1). While using the aqueous dispersion as circulating cooling water, the raw pellets (A'1) of the acrylic block copolymer obtained in Synthetic Example 1 were repelletized with an underwater cutting extruder described later to form spherical pellets having a diameter of about 3 mm, which were then passed through a centrifugal dehydrator and recovered. Pellets (D1) were thus obtained. The results are described in Table 2.

(Production Conditions)
  Dry grinders: Impact grinder (ACM Pulverizer-10 manufactured by HOSOKAWA MICRON CORPORATION), counter jet mill (200AFG manufactured by HOSOKAWA MICRON CORPORATION).
  Underwater cutting extruder: JSW-JBa II, twin-screw, screw diameter 54 mm, L/D=42.
  Extrusion conditions: Temperature 230° C., resin throughput 200 kg/h, screw rotational speed 520 rpm, die orifice diameter 2.4 mm×48 orifices, 4-blade cutter, circulating cooling water (PCW) 45° C., PCW flow rate 200 L/min.
  Centrifugal dehydrator (manufactured by The Japan Steel Works, LTD.).

Production Example 2

Pellets (D2) were obtained in the same manner as in Production Example 1, except that the raw pellets (A'1) of the acrylic block copolymer were replaced by the raw pellets (A'4) of the acrylic block copolymer obtained in Synthetic Example 4. The results are described in Table 2.

Production Example 3

An acrylic resin (content of methyl methacrylate units: 90 mass %, weight average molecular weight: 85,000) was ground with a dry grinder described later to give acrylic resin particles (B0) having a D50 value in the ground particle size distribution of 27 μm. The acrylic resin particles were then ground with a wet grinder described later in water as a medium to give an aqueous dispersion of acrylic resin particles (B2) having a D50 value in the ground particle size distribution of 6 μm. Thereafter, the solid concentration was adjusted to 0.5 mass %, thus forming an aqueous dispersion (C-1-1). While using the aqueous dispersion as circulating cooling water, the raw pellets (A'1) of the acrylic block copolymer obtained in Synthetic Example 1 were repelletized with the underwater cutting extruder described in Production Example 1 to form spherical pellets having a diameter of about 3 mm, which were then passed through a centrifugal dehydrator and recovered. Pellets (D3) were thus obtained. The results are described in Table 2.
  Dry grinder: Impact grinder (ACM Pulverizer-10 manufactured by HOSOKAWA MICRON CORPORATION).
  Wet grinder: Star Mill (LMZ manufactured by Ashizawa Finetech Ltd.).

Production Examples 4 to 6

Pellets (D4) to (D6) were obtained in the same manner as in Production Example 3, except that the raw pellets (A'1) of the acrylic block copolymer were replaced by the raw pellets of the acrylic block copolymer described in Table 2. The results are described in Table 2.

Production Example 7

An aqueous dispersion of acrylic resin particles (B3) having a D50 value after grinding of 9 μm was produced in the same manner and using the same wet grinder as in Production Example 3. Thereafter, the solid concentration was adjusted to 0.5 mass %, thus forming an aqueous dispersion (C-1-2). While using the aqueous dispersion as circulating cooling water, the raw pellets (A'1) of the acrylic block copolymer obtained in Synthetic Example 1 were repelletized with the underwater cutting extruder to form spherical pellets having a diameter of about 3 mm, which were then passed through a centrifugal dehydrator and recovered. Pellets (D7) were thus obtained. The results are described in Table 2.

Production Example 8

Aerosil R972 (manufactured by Nippon Aerosil Co., Ltd., hydrophobic silicon dioxide) was dispersed in water so that the solid concentration would be 0.5 mass %. While using the aqueous dispersion as circulating cooling water, an attempt was made to repelletize the raw pellets (A'1) of the acrylic block copolymer in the same manner as in Production Example 1. However, because Aerosil R972 was hydrophobic and was therefore poorly dispersible in water, the solid could not be attached sufficiently to the pellets. Consequently, the centrifugal dehydrator was clogged by the blocking of the pellets, and the process flow efficiency was significantly low. The amount of Aerosil R972 attached to the pellets was so small and was below the detection limit. The results are described in Table 2.

Production Example 9

An attempt was made to repelletize the pellets in the same manner as in Production Example 8, except that Aerosil R972 was replaced by Aerosil 200V (manufactured by Nippon Aerosil Co., Ltd., hydrophilic silicon dioxide). Aerosil 200V was hydrophilic and therefore showed good dispersibility in water. However, the solid could not be attached to the pellets. Consequently, the centrifugal dehydrator was clogged by the blocking of the pellets, and the process flow efficiency was significantly low. The amount of Aerosil 200V attached to the pellets was so small and was below the detection limit. The results are described in Table 2.

Production Example 10

An attempt was made to repelletize the pellets in the same manner as in Production Example 8, except that Aerosil R972 was replaced by ALFLOW H50T (manufactured by NOF CORPORATION, ethylenebisstearamide). ALFLOW H50T was poorly dispersible in water, and the solid could not be attached to the pellets. Consequently, the centrifugal dehydrator was clogged by the blocking of the pellets, and the process flow efficiency was significantly low. The amount of ALFLOW $H_5OT$ attached to the pellets was so small and was below the detection limit. The results are described in Table 2.

Production Example 11

An attempt was made to repelletize the pellets in the same manner as in Production Example 8, except that Aerosil R972 was replaced by ALFLOW H50ES (manufactured by NOF CORPORATION, ethylenebisstearamide emulsion: 42 mass % nonvolatile components). ALFLOW H50ES was highly dispersible in water and was excellently attached to the pellets. The die or the centrifugal dehydrator did not suffer from clogging due to the blocking of the pellets, and good process flow efficiency was attained. Pellets (D11) were thus obtained. The results are described in Table 2.

Production Example 12

The acrylic resin particles (B1) obtained in Production Example 1 were added on-line to the centrifugally dehydrated pellets (D1) from the process described in Production Example 1, in a ratio of about 500 ppm relative to the mass of the pellets. Pellets (D'1) were thus obtained. The results are described in Table 3.

Production Examples 13 to 17

Pellets (D'2) to (D'6) were obtained in the same manner as in Production Example 12, except that the acrylic resin particles (B1) and the pellets (D1) were changed as described in Table 3. The results are described in Table 3.

Production Example 18

ALFLOW H50T was added on-line to the centrifugally dehydrated pellets (D11) from the process described in Production Example 11, in a ratio of about 500 ppm relative to the mass of the pellets. Pellets (D'7) were thus obtained. The results are described in Table 3.

Production Example 19

Aerosil R972 was added on-line to the centrifugally dehydrated pellets (D11) from the process described in Production Example 11, in a ratio of about 500 ppm relative to the mass of the pellets. Pellets (D'8) were thus obtained. The results are described in Table 3.

Production Example 20

An aqueous dispersion (C-1-1) having a solid concentration of 0.5 mass % which had been prepared in the same manner as in Production Example 3 was combined with 100 ppm of sodium oleate as a surfactant. While using this aqueous dispersion as circulating cooling water, an attempt was made to repelletize the raw pellets (A'1) of the acrylic block copolymer obtained in Synthetic Example 1, using the underwater cutting extruder. The dispersibility in water was enhanced by virtue of the addition of the surfactant, but the dispersion formed heavy froths and the process flow efficiency was significantly lowered. Further, the solid was not sufficiently attached to the pellets. The centrifugal dehydrator was clogged by the blocking of the pellets, and the overall process flow efficiency was significantly low. The results are described in Table 2.

TABLE 2

| | Production Examples | | | | | | | |
|---|---|---|---|---|---|---|---|---|
| | 1 | 2 | 3 | 4 | 5 | 6 | 7 | 20 |
| Pellets (D) | (D1) | (D2) | — | (D3) | (D4) | (D5) | (D6) | (D7) | (D12) |
| Acrylic resin particles (B) | (B1) | (B1) | (B0) | (B2) | (B2) | (B2) | (B2) | (B3) | (B2) |
| Aqueous dispersion (C) | (C-2-1) | (C-2-1) | — | (C-1-1) | (C-1-1) | (C-1-1) | (C-1-1) | (C-1-2) | (C-1-1) |
| Surfactant (sodium oleate) | — | — | — | — | — | — | — | — | 100 ppm |
| Average particle sizes D10/D50/D90 (μm) | 4/6/9 | 4/6/9 | 10/27/47 | 2/6/18 | 2/6/18 | 2/6/18 | 2/6/18 | 3/9/26 | 2/6/18 |
| Solid concentration (mass %) | 0.5 | 0.5 | — | 0.5 | 0.5 | 0.5 | 0.5 | 0.5 | 0.5 |
| Amount of attachment (ppm) | 1000 | 1000 | — | 1100 | 700 | 1000 | 1100 | 900 | 150 |
| Acrylic block copolymer (A) | (A1) | (A4) | — | (A1) | (A2) | (A3) | (A4) | (A1) | (A1) |

| | Production Examples | | | |
|---|---|---|---|---|
| | 8 | 9 | 10 | 11 |
| Pellets (D) | (D8) | (D9) | (D10) | (D11) |
| Antiblocking agent | Aerosil R972 | Aerosil 200V | ALFLOW H50T | ALFLOW H50ES |
| Aqueous dispersion (C) | Aqueous dispersion | Aqueous dispersion | Aqueous dispersion | Emulsion |
| Average particle size | About 16 nm | About 12 nm | 40 μm | 2 μm |
| Amount of attachment (ppm) | Below detection limit | Below detection limit | Below detection limit | 1000 |
| Acrylic block copolymer (A) | (A1) | (A1) | (A1) | (A1) |

TABLE 3

| | | Production Examples | | | | | |
|---|---|---|---|---|---|---|---|
| | | 12 | 13 | 14 | 15 | 16 | 17 |
| Pellets (D') | | (D'1) | (D'2) | (D'3) | (D'4) | (D'5) | (D'6) |
| Acrylic resin particles (B) | Step (2) | (B1) | (B2) | (B2) | (B2) | (B3) | (B2) |
| Aqueous dispersion (C) | | (C-2-1) | (C-1-1) | (C-1-1) | (C-1-1) | (C-1-2) | (C-1-1) |
| Pellets (D) | | (D1) | (D3) | (D5) | (D6) | (D7) | (D3) |
| Acrylic resin particles (B) | Step (2') | (B1) | (B1) | (B1) | (B1) | (B1) | (B0) |
| Amount of attachment | (ppm) | 1500 | 1600 | 1500 | 1600 | 1400 | 1600 |

| | | Production Examples | |
|---|---|---|---|
| | | 18 | 19 |
| Pellets (D') | | (D'7) | (D'8) |
| Antiblocking agent | Step (2) | ALFLOW H50ES | ALFLOW H50ES |
| Pellets (D) | | (D11) | (D11) |
| Antiblocking agent | Step (2') | ALFLOW H50T | Aerosil R972 |
| Amount of attachment | (ppm) | 1500 | 1500 |

Laminates (adhesive films) fabricated by an extrusion laminating process will be described hereinbelow. The following are the substrate layers and the nonwoven fabrics which were used.

(Substrate Layers)

PET film: E5000, 75 μm thick, manufactured by TOYOBO CO., LTD.

Silicon release-treated PET film: A31, 25 μm thick, manufactured by Teijin Solutions Limited.

(Nonwoven Fabrics)

Nonwoven fabric A: Polyester nonwoven fabric 15TH-36, manufactured by HIROSE PAPER MFG CO., LTD.

Nonwoven fabric B: Polyester nonwoven fabric 05TH-20, manufactured by HIROSE PAPER MFG CO., LTD.

Example 1

The pellets (D1) obtained in Production Example 1 were charged into a twin-screw extruder through a hopper, thermally melted at a temperature of 290° C., and laminated onto the PET film by a T-die method to form an adhesive layer having a width of 300 mm and a thickness of 75 μm. Further, the adhesive layer was covered with the silicon release-treated PET. An adhesive film was thus fabricated. The take-off speed was 4.0 m/min. The pellets (D1) used were excellent in antiblocking properties and thus could be supplied to the twin-screw extruder at a stable rate without becoming blocked, and the adhesive film obtained attained a small variation in thickness (±2 μm). After one hour of continuous operation, there was no die buildup around the die head.

Next, the adhesive film obtained was cut into a width of 10 mm and a length of 100 mm. The cutout from the adhesive film was attached to a glass plate, and a 2 kg roller was reciprocated thereon two times. After the lapse of 24 hours at room temperature, the adhesive film was peeled off and the glass surface was visually observed. There was no adhesive residue or whatsoever, and the adherend was free from contamination. The results are described in Table 4.

Examples 2 to 12

Adhesive films were fabricated and evaluated in the same manner as in Example 1, except that the conditions were changed as shown in Table 4. The pellets that had been obtained from the acrylic resin microparticle dispersion prepared using a wet grinder, and the pellets that had been treated with the acrylic resin microparticles on-line after centrifugal dehydration were not blocked with one another when the pellets were supplied to the hopper, and also remained free from blocking in the hopper and were successfully supplied to the extruder at a more stable rate. The results are described in Table 4.

Comparative Example 1

An attempt was made to repeat the process of Example 1 using the raw pellets (A'1) of the acrylic block copolymer obtained in Synthetic Example 1, but failed to produce the desired adhesive film because the pellets were heavily blocked in the hopper and could not be stably supplied to the twin-screw extruder. The results are described in Table 4.

Comparative Examples 2 to 4, and 7

An attempt was made to repeat the process of Example 1 while changing the conditions as shown in Table 4, but failed to produce the desired adhesive film because the pellets were heavily blocked in the hopper and could not be stably supplied to the twin-screw extruder. The results are described in Table 4.

Comparative Examples 5 and 6

The process of Example 1 was repeated, except that the conditions were changed as shown in Table 4. The pellets could be supplied to the twin-screw extruder at a more stable rate without becoming blocked, and the adhesive films obtained attained a small variation in thickness (±2 μm). After one hour of continuous operation, however, die buildup was seen around the die head. Further, the adhesive performance was evaluated in the same manner as in Example 1. The adhesive remained on the glass surface, and the adhesive films were shown to tend to contaminate the adherend. The results are described in Table 4.

TABLE 4

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Pellets (D) | | (D1) | (D3) | (D3) | (D3) | (D'1) | (D'2) | (D'5) | (D'6) | (D5) | (D'3) | (D4) | (D'4) |
| Substrate | | PET | | Nonwoven fabric A | Nonwoven fabric B | | | | PET | | | | |
| Extrusion processability | Antiblocking properties of pellets (extruder) | AA | AA | AA | AA | AA | AA | AA | AA | AA | AA | AA | AA |
| | Antiblocking properties of pellets (hopper) | BB | AA | AA | AA | AA | AA | AA | AA | AA | AA | AA | AA |
| | Shaping temperature (° C.) | 290 | 290 | 290 | 290 | 290 | 290 | 290 | 290 | 300 | 300 | 185 | 290 |
| | Adhesive thickness (μm) | 75 ± 2 | 75 ± 2 | 75 ± 2 | 75 ± 2 | 75 ± 2 | 75 ± 2 | 75 ± 2 | 75 ± 2 | 75 ± 2 | 75 ± 2 | 75 ± 2 | 75 ± 2 |
| | Die buildup | Absent | Absent | Absent | Absent | Absent | Absent | Absent | Absent | Absent | Absent | Absent | Absent |
| Performance | Adhesive performance (Adherend contamination) | Absent | Absent | Absent | Absent | Absent | Absent | Absent | Absent | Absent | Absent | Absent | Absent |

| | | Comparative Examples | | | | | | |
|---|---|---|---|---|---|---|---|---|
| | | 1 | 2 | 3 | 4 | 5 | 6 | 7 |
| Pellets (D) | | (A'1) | (D10) | (D8) | (D9) | (D'7) | (D'8) | (D12) |
| Substrate | | | | | PET | | | |
| Extrusion processability | Antiblocking properties of pellets (extruder) | CC | CC | CC | CC | AA | AA | CC |
| | Antiblocking properties of pellets (hopper) | BB | BB | BB | BB | AA | AA | BB |
| | Shaping temperature (° C.) | 290 | 290 | 290 | 290 | 290 | 290 | 290 |
| | Adhesive thickness (μm) | — | — | — | — | 75 ± 2 | 75 ± 2 | — |
| | Die buildup | — | — | — | — | Present | Present | — |
| Performance | Adhesive performance (Adherend contamination) | — | — | — | — | Present | Present | — |

Laminates (adhesive films) fabricated by a coextrusion process will be described hereinbelow. The following are the substrate layer, the intermediate layers and the adhesive layers which were used.

(Substrate Layer)

Block PP: Novatec PP "BC4FC" manufactured by Japan Polypropylene Corporation.

(Intermediate Layers)

The materials were melt kneaded in the proportions shown in Table 5 using a twin-screw extruder at 230° C., and the kneaded mixture was extruded and pelletized with a strand cutter. Resin compositions (N1 to N3) for intermediate layers were thus obtained.

Product name: "Acryft WH401-F" manufactured by Sumitomo Chemical Co., Ltd.

Product name: "ELVALOY AC12024S" manufactured by DU PONT-MITSUI POLYCHEMICALS.

Product name: "PARAPET GF" manufactured by KURARAY CO., LTD.

TABLE 5

| (mass %) | N1 | N2 | N3 |
|---|---|---|---|
| Aromatic vinyl block copolymer (M1) | 25 | 20 | 25 |
| PARAPET GF | 25 | 20 | 25 |

TABLE 5-continued

| (mass %) | N1 | N2 | N3 |
|---|---|---|---|
| Acryft WH401-F | | 60 | 50 |
| ELVALOY AC12024S | 50 | | |

(Adhesive Layers)

Tackifier resin W: Product name "YS RESIN SX100" manufactured by YASUHARA CHEMICAL CO., LTD., aromatic hydrocarbon resin.

Tackifier resin X: Product name "ARKON P140" manufactured by Arakawa Chemical Industries, Ltd., hydrogenated petroleum resin.

(Pre-Kneading of Adhesive Compositions)

In Example 16, the pellets and the tackifier resin for forming an adhesive layer were dry blended, and the blend was melt kneaded with a twin-screw extruder at 230° C. and was extruded into strands. The strands were passed through the 0.5 mass % aqueous dispersion (C-1-1) of the acrylic resin particles (B2) used in Production Example 3, and were thereafter pelletized with a strand cutter. The pellets thus obtained were used for coextrusion. This manner of use is written as "pre-kneaded before pelletization" in Table 6.

Examples 13 to 19

Using a T-die coextrusion device fitted with a three-component three-layer feedblock, the components for a substrate layer, an intermediate layer and an adhesive layer were charged into a single-screw extruder through respective hoppers, and were thermally melted at the temperatures described later. The melts were fed to the T-die and were coextruded under the conditions described later to form an adhesive film. The dry blend of the pellets and the tackifier resin, and the pellets that had been pre-kneaded before the coextrusion were all excellent in antiblocking properties and could be supplied to the single-screw extruder at a stable rate without becoming blocked. The adhesive films obtained attained a small variation in total thickness (±2 μm). In particular, the pellets used in Examples 14 to 19 had been obtained from the acrylic resin microparticle dispersion prepared using a wet grinder, or had been treated with the acrylic resin microparticles on-line after centrifugal dehydration, and thus were not blocked with one another when the pellets were supplied to the hopper, and also remained free from blocking in the hopper and were successfully supplied to the extruder at a more stable rate. After one hour of continuous operation, there was no die buildup around the die head.

Next, the adhesive films obtained were each cut into a width of 10 mm and a length of 100 mm. The cutouts from the adhesive films were attached to a glass plate, and a 2 kg roller was reciprocated thereon two times. After the lapse of 24 hours at room temperature, the adhesive films were peeled off and the glass surface was visually observed. There was no adhesive residue or whatsoever, and the adherend was free from contamination.

<Coextrusion Conditions>
Layer Configuration and Layer Thicknesses
Substrate layer/intermediate layer/adhesive layer=40 μm/10 μm/10 μm.
Extrusion Temperatures
The shaping temperatures during extrusion of the layers in the extruder were 230° C. for the substrate layer, 210° C. for the intermediate layer, and 230° C. for the adhesive layer.

Configurations of T-die, feedblock and cooling roll, temperatures thereof during shaping, and take-off width conditions The width of the T-die was 300 mm. The temperature to the point where the three types of compositions joined together, namely, the temperatures of the adapter, the T-die and the three-component three-layer feedblock (the shaping device at the confluence point) were each set to 230° C. The temperature of the cooling roll for taking off the laminate discharged from the T-die was 40° C., and the take-off speed was 4.0 m/min. The laminate was wound directly without use of a cover film.

Comparative Example 8

The raw pellets (A' 1) obtained in Synthetic Example 1 were used as a material for forming an adhesive layer. The components for a substrate layer, an intermediate layer and an adhesive layer were charged into a single-screw extruder from respective hoppers similarly to Example 13. Coextrusion was attempted but failed to produce the desired adhesive film because the pellets were heavily blocked in the hopper and could not be stably supplied to the single-screw extruder.

Comparative Example 9

The process of Example 13 was repeated using the pellets (D'7). The pellets (D'7) used were excellent in antiblocking properties and thus could be supplied to the single-screw extruder at a more stable rate without becoming blocked, and the adhesive film obtained attained a small variation in total thickness (±2 μm). After one hour of continuous operation, however, die buildup was seen around the die head. Further, the evaluation of the adhesive performance resulted in adhesive residue on the glass surface, and the adhesive film was shown to tend to contaminate the adherend.

TABLE 6

| (mass %) | | Examples | | | | | | | Comparative Examples | |
|---|---|---|---|---|---|---|---|---|---|---|
| | | 13 | 14 | 15 | 16 | 17 | 18 | 19 | 8 | 9 |
| Substrate | | Block PP | | | | | | | | |
| Intermediate layer | | N1 | N2 | N3 | N2 | N2 | N2 | N2 | N2 | — |
| Adhesive layer | Pellets (D1) | 100 | | | | | | | | |
| | Pellets (D'5) | | 100 | | 100 | 100 | 100 | 100 | | |
| | Pellets (D'3) | | | 100 | | | | | | |
| | Pellets (A1) | | | | | | | | 100 | |
| | Pellets (D'7) | | | | | | | | | 100 |
| | Tackifier resin W | | | | 5 | 5 | 10 | | | |
| | Tackifier resin X | | | | | | | 5 | | |
| | Manner of use in coextrusion | (D1) Directly | (D'5) Directly | (D'3) Directly | Pre-kneaded before pelletization | Dry blend | Dry blend | Dry blend | (A1) Directly | (D'7) Directly |
| Extrusion processability | Antiblocking properties of pellets (extruder) | AA | AA | AA | AA | AA | AA | AA | CC | AA |
| | Antiblocking properties of pellets (hopper) | BB | AA | AA | AA | AA | AA | AA | BB | AA |
| | Total thickness (μm) | 60 ± 2 | 60 ± 2 | 60 ± 2 | 60 ± 2 | 60 ± 2 | 60 ± 2 | 60 ± 2 | — | 60 ± 2 |
| | Die buildup | Absent | Absent | Absent | Absent | Absent | Absent | Absent | — | Present |
| Performance | Adhesive performance (Adherend contamination) | Absent | Absent | Absent | Absent | Absent | Absent | Absent | — | Present |

Laminates (adhesive films) fabricated by a hot melt coating process will be described hereinbelow. The following are the substrate layers, the tackifier resins and the plasticizers which were used.

(Substrate Layers)

PET film: E5000, 75 μm thick, manufactured by TOYOBO CO., LTD.

Silicon release-treated PET film: A31, 25 μm thick, manufactured by Teijin Solutions Limited.

(Tackifier Resins)

Tackifier resin O: Product name "KE311" manufactured by Arakawa Chemical Industries, Ltd., hydrogenated rosin ester.

Tackifier resin P: Product name "Ysertack 311" manufactured by Euro Yser, rosin ester.

Tackifier resin Q: Product name "Pensel D125" manufactured by Arakawa Chemical Industries, Ltd., polymerized rosin ester.

Tackifier resin R: Product name "FORAL AX-E" manufactured by Eastman, rosin acid.

Tackifier resin S: Product name "YS POLYSTER T160" manufactured by YASUHARA CHEMICAL CO., LTD., terpene phenol resin.

Tackifier resin T: Product name "YS RESIN SX100" manufactured by YASUHARA CHEMICAL CO., LTD., aromatic hydrocarbon resin.

Tackifier resin U: Product name "ARKON P100" manufactured by Arakawa Chemical Industries, Ltd., hydrogenated petroleum resin.

(Plasticizers)

Plasticizer L1: Product name "DOTP" manufactured by Eastman, bis(2-ethylhexyl) terephthalate.

Plasticizer L2: Product name "ATBC" manufactured by ASAHI KASEI FINECHEM CO., LTD., tributyl acetylcitrate.

Plasticizer L3: Product name "Micryl 105" manufactured by Polychem Corporation, poly-n-butyl acrylate oligomer.

Examples 20 to 29

According to the formulation described in Table 7, the pellets were charged into a kneader set at 170° C. and were melted uniformly. The pellets used were excellent in antiblocking properties and thus could be charged into the kneader in the predetermined amount quickly without becoming blocked. Thereafter, the temperature of the kneader was set to 155° C., the tackifier resin was added according to the formulation described in Table 7, and the mixture was melt kneaded to uniformity. Thereafter, the plasticizer was added according to the formulation described in Table 7, and the mixture was melt kneaded to uniformity. Adhesive compositions were thus obtained. The melt of the adhesive composition obtained was applied onto the PET film using a non-contact hot melt coater (a cloth coater manufactured by ITW Dynatec K.K.) at 170° C. so that the thickness of the adhesive layer would be 25 μm. Further, the adhesive layer was covered with the silicon release-treated PET described hereinabove. Adhesive films were thus fabricated. The take-off speed was 4.0 m/min. After one hour of continuous operation, there was no die buildup around the die head.

Next, the adhesive films obtained were each cut into a width of 10 mm and a length of 100 mm. The cutouts from the adhesive films were attached to a glass plate, and a 2 kg roller was reciprocated thereon two times. After the lapse of 24 hours at room temperature, the adhesive films were peeled off and the glass surface was visually observed. There was no adhesive residue or whatsoever, and the adherend was free from contamination.

Comparative Example 10

The raw pellets (A'1) obtained in Synthetic Example 1 were used as a material for forming an adhesive layer. An attempt was made to add the predetermined amount of the pellets into the kneader similarly to Example 20. However, the raw pellets (A'1) had been heavily blocked and thus could not be added as such in the predetermined amount. The pellets were charged after being forcibly crushed and consequently the amount added was not exact. Other results were similar to those in Example 20.

Comparative Examples 11 and 12

Adhesive films were fabricated in the same manner as in Example 20, except that the conditions were changed as described in Table 7. Adhesive compositions having a formulation described in Table 7 were obtained. The pellets used were excellent in antiblocking properties and thus could be charged into the kneader in the predetermined amount quickly without becoming blocked. The melt of the adhesive composition obtained was applied onto the PET film using a non-contact hot melt coater (a cloth coater manufactured by ITW Dynatec K.K.) at 170° C. so that the thickness of the adhesive layer would be 25 μm. Further, the adhesive layer was covered with the silicon release-treated PET described hereinabove. Adhesive films were thus fabricated. The take-off speed was 4.0 m/min. After one hour of continuous operation, die buildup was seen around the die head.

Next, the adhesive films obtained were each cut into a width of 10 mm and a length of 100 mm. The cutouts from the adhesive films were attached to a glass plate, and a 2 kg roller was reciprocated thereon two times. After the lapse of 24 hours at room temperature, the adhesive films were peeled off and the glass surface was visually observed. The adhesive remained on the glass surface, and the adhesive films were shown to tend to contaminate the adherend.

TABLE 7

| (mass %) | | Examples | | | | | | | | | | Comparative Examples | | |
|---|---|---|---|---|---|---|---|---|---|---|---|---|---|---|
| | | 20 | 21 | 22 | 23 | 24 | 25 | 26 | 27 | 28 | 29 | 10 | 11 | 12 |
| Adhesive composition | Pellets (D1) | 100 | | | | | | | | | | | | |
| | Pellets (D'5) | | 100 | 100 | 100 | 100 | 100 | 100 | 100 | | | | | |
| | Pellets (D'3) | | | | | | | | | 100 | | | | |
| | Pellets (D2) | | | | | | | | | | 100 | | | |
| | Pellets (A'1) | | | | | | | | | | | 100 | | |

TABLE 7-continued

| (mass %) | | Examples | | | | | | | | | | Comparative Examples | | |
|---|---|---|---|---|---|---|---|---|---|---|---|---|---|---|
| | | 20 | 21 | 22 | 23 | 24 | 25 | 26 | 27 | 28 | 29 | 10 | 11 | 12 |
| | Pellets (D'7) | | | | | | | | | | | | 100 | |
| | Pellets (D'8) | | | | | | | | | | | | | 100 |
| | Tackifier resin O | 100 | 35 | | | | | | | 35 | 35 | 35 | 35 | 35 |
| | Tackifier resin P | | | 35 | | | | | | | | | | |
| | Tackifier resin Q | | | | 15 | | | | | | | | | |
| | Tackifier resin R | | | | | 35 | | | | | | | | |
| | Tackifier resin S | | | | | | 35 | | | | | | | |
| | Tackifier resin T | | | | | | | 35 | | | | | | |
| | Tackifier resin U | | | | | | | | 5 | | | | | |
| | Plasticizer (L1) | | | | 15 | 15 | | | 15 | | | | | |
| | Plasticizer (L2) | 10 | 15 | 15 | | | 15 | 15 | 15 | 10 | 15 | 15 | 15 | |
| | Plasticizer (L3) | | | | 10 | | | | 50 | | | | | |
| Extrusion processability | Antiblocking properties of pellets (kneader) | AA | AA | AA | AA | AA | AA | AA | AA | AA | AA | CC | AA | AA |
| | Die buildup (during application) | Absent | Absent | Absent | Absent | Absent | Absent | Absent | Absent | Absent | Absent | Absent | Present | Present |
| Performance | Adhesive performance (Adherend contamination) | Absent | Absent | Absent | Absent | Absent | Absent | Absent | Absent | Absent | Absent | Absent | Present | Present |

The invention claimed is:

1. A laminate production method, comprising:
   (1) bringing raw pellets of an acrylic block copolymer (A) into contact with an aqueous dispersion (C) comprising acrylic resin particles (B) and no surfactants, thereby attaching the acrylic resin particles (B) to the acrylic block copolymer (A),
   wherein the acrylic block copolymer (A) comprises at least one polymer block (a1) comprising acrylic acid alkyl ester units and at least one polymer block (a2) comprising methacrylic acid alkyl ester units,
   (2) removing water attached to pellets formed in (1), thereby obtaining pellets (D), and
   (3) preparing an adhesive composition using an adhesive feedstock comprising the pellets (D) from (2), and extruding the adhesive composition to form an adhesive layer, thereby producing a laminate comprising the adhesive layer and a substrate layer,
   wherein
   the acrylic block copolymer (A) is represented by a2-a1-a2, wherein a2 is the polymer block (a2) and a1 is the polymer block (a1),
   an acrylic resin forming the acrylic resin particles (B) comprises at least 85 mass % of methyl methacrylate units, and
   a solid concentration of the acrylic resin particles (B) in the aqueous dispersion (C) is from 0.05 to 2.0 mass %.

2. The laminate production method according to claim 1, wherein the adhesive layer and the substrate layer are both formed by extrusion in (3).

3. The laminate production method according to claim 1, wherein the aqueous dispersion (C) comprises at least one selected from the group consisting of an aqueous dispersion (C-1) comprising wet-ground acrylic resin particles (B), and an aqueous dispersion (C-2) comprising dry-ground acrylic resin particles (B).

4. The laminate production method according to claim 3, wherein the aqueous dispersion (C) comprises the aqueous dispersion (C-1).

5. A laminate production method, comprising:
   (1) bringing raw pellets of an acrylic block copolymer (A) into contact with an aqueous dispersion (C) comprising acrylic resin particles (B) and no surfactants, thereby attaching the acrylic resin particles (B) to the acrylic block copolymer (A),
   wherein the acrylic block copolymer (A) comprises at least one polymer block (a1) comprising acrylic acid alkyl ester units and at least one polymer block (a2) comprising methacrylic acid alkyl ester units,
   (2) removing water attached to pellets formed in (1), thereby obtaining pellets (D),
   (2') bringing additional acrylic resin particles (B) into contact with the pellets (D), thereby obtaining pellets (D'), and
   (3') preparing an adhesive composition using an adhesive feedstock comprising the pellets (D') from (2'), and extruding the adhesive composition to form an adhesive layer, thereby producing a laminate comprising the adhesive layer and a substrate layer,
   wherein
   the acrylic block copolymer (A) is represented by a2-a1-a2 where a2 is the polymer block (a2) and a1 is the polymer block (a1),
   an acrylic resin forming the acrylic resin particles (B) comprises at least 85 mass % of methyl methacrylate units, and
   a solid concentration of the acrylic resin particles (B) in the aqueous dispersion (C) is from 0.05 to 2.0 mass %.

6. The laminate production method according to claim 5, wherein the adhesive layer and the substrate layer are both formed by extrusion in (3').

7. The laminate production method according to claim 5, wherein the adhesive composition is prepared in (3') by melt kneading an adhesive feedstock comprising the pellets (D) and the pellets (D').

8. The laminate production method according to claim 5, wherein the aqueous dispersion (C) comprises at least one selected from the group consisting of an aqueous dispersion (C-1) comprising wet-ground acrylic resin particles (B), and an aqueous dispersion (C-2) comprising dry-ground acrylic resin particles (B).

9. A laminate production method, comprising:

obtaining pellets (D) through bringing raw pellets of an acrylic block copolymer (A) into contact with an aqueous dispersion (C) comprising acrylic resin particles (B) and no surfactants, preparing an adhesive composition using an adhesive feedstock comprising the pellets (D), and extruding the adhesive composition to form an adhesive layer, thereby producing a laminate comprising the adhesive layer and a substrate layer, wherein the acrylic block copolymer (A) comprises at least one polymer block (a1) comprising acrylic acid alkyl ester units and at least one polymer block (a2) comprising methacrylic acid alkyl ester units, and in the pellets (D) the acrylic resin particles (B) are attached to the acrylic block copolymer (A), wherein the acrylic block copolymer (A) is represented by a2-a1-a2, wherein a2 is the polymer block (a2) and a1 is the polymer block (a1), an acrylic resin forming the acrylic resin particles (B) comprises at least 85 mass % of methyl methacrylate units, and a solid concentration of the acrylic resin particles (B) in the aqueous dispersion (C) is from 0.05 to 2.0 mass %.

10. The laminate production method according to claim 9, wherein the aqueous dispersion (C) comprises at least one selected from the group consisting of an aqueous dispersion (C-1) comprising wet-ground acrylic resin particles (B), and an aqueous dispersion (C-2) comprising dry-ground acrylic resin particles (B).

* * * * *